US010740855B2

(12) United States Patent
Lesik et al.

(10) Patent No.: US 10,740,855 B2
(45) Date of Patent: Aug. 11, 2020

(54) SUPPLY CHAIN TRACKING OF FARM PRODUCE AND CROPS

(71) Applicant: Hand Held Products, Inc., Fort Mill, SC (US)

(72) Inventors: Joseph R. Lesik, Greenburg, PA (US); Brian Sutton, North Huntingdon, PA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 601 days.

(21) Appl. No.: 15/378,124

(22) Filed: Dec. 14, 2016

(65) Prior Publication Data
US 2018/0165771 A1    Jun. 14, 2018

(51) Int. Cl.
G06Q 50/02    (2012.01)
G06Q 10/08    (2012.01)

(52) U.S. Cl.
CPC ........... G06Q 50/02 (2013.01); G06Q 10/087 (2013.01)

(58) Field of Classification Search
CPC .............................. G06Q 10/087; G06Q 50/02
See application file for complete search history.

(56) References Cited

U.S. PATENT DOCUMENTS

| | | |
|---|---|---|
| 6,832,725 B2 | 12/2004 | Gardiner et al. |
| 7,128,266 B2 | 10/2006 | Marlton et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 13/367,978, filed Feb. 7, 2012, (Feng et al.); now abandoned.

(Continued)

*Primary Examiner* — A. Hunter Wilder
*Assistant Examiner* — Joseph M Mutschler
(74) *Attorney, Agent, or Firm* — Alston & Bird LLP

(57) ABSTRACT

A device, system, and method are disclosed whereby farm produce harvested at a particular time and location can be tracked throughout the food supply chain, from farm or orchard to consumer market. If farm produce in the market is found to be unhealthy, contaminated, or otherwise unsuited for human consumption, the system and method enables identification of the source of harvesting, and so identification of other produce which was harvested at substantially the same time and location. This enables improved identification and containment of any problems in the produce food supply chain.

20 Claims, 7 Drawing Sheets

(56) References Cited

U.S. PATENT DOCUMENTS

| | | |
|---|---|---|
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |

(56) References Cited

U.S. PATENT DOCUMENTS

| | | |
|---|---|---|
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey |
| 9,342,827 B2 | 5/2016 | Smith |
| 9,355,294 B2 | 5/2016 | Smith et al. |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,407,840 B2 | 8/2016 | Wang |
| 9,412,242 B2 | 8/2016 | Van Horn et al. |
| 9,418,252 B2 | 8/2016 | Nahill et al. |
| D766,244 S | 9/2016 | Zhou et al. |
| 9,443,222 B2 | 9/2016 | Singel et al. |
| 9,448,610 B2 | 9/2016 | Davis et al. |
| 9,478,113 B2 | 10/2016 | Xie et al. |
| 9,582,696 B2 | 2/2017 | Barber et al. |
| 9,616,749 B2 | 4/2017 | Chamberlin |
| 9,618,993 B2 | 4/2017 | Murawski et al. |
| 9,715,614 B2 | 7/2017 | Todeschini et al. |
| 9,734,493 B2 | 8/2017 | Gomez et al. |
| 10,019,334 B2 | 7/2018 | Caballero et al. |
| 10,021,043 B2 | 7/2018 | Sevier |
| 10,327,158 B2 | 6/2019 | Wang et al. |
| 10,410,029 B2 | 9/2019 | Powilleit |
| 2007/0063048 A1 | 3/2007 | Havens et al. |
| 2009/0134221 A1 | 5/2009 | Zhu et al. |
| 2009/0254460 A1* | 10/2009 | Farmer .......... G06Q 10/06 705/28 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0029413 A1* | 2/2011 | Ben-Tzur .......... G06Q 10/08 705/28 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |

(56) References Cited

U.S. PATENT DOCUMENTS

| | | |
|---|---|---|
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0121807 A1* | 5/2014 | Jung .............. G06Q 10/06313 700/115 |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | DiGregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0337186 A1* | 11/2014 | Sabarez, II .......... G06Q 10/087 705/28 |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |

(56) References Cited

U.S. PATENT DOCUMENTS

| | | |
|---|---|---|
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0307153 A1* | 10/2016 | Loken ............... G06Q 10/0833 |
| 2016/0314276 A1 | 10/2016 | Sewell et al. |
| 2016/0314294 A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 papes.

U.S. Appl. No. 14/283,282 for Terminal Having Illumination and Focus Control filed May 21, 2014 (Liu et al.) 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Barndringa); 38 pages.

U.S. Appl. No. 14/740,373 for Calibrating a Volume Dimensioner filed Jun. 16, 2015 (Ackley et al.);63 pages.

U.S. Patent Application for a Laser Scanning Module Employing an Elastomeric U-Hinge Based Laser Scanning Assembly, filed Feb. 7, 2012 (Feng et al.), U.S. Appl. No. 13/367,978.

U.S. Patent Application for Indicia Reader filed Apr. 1, 2015 (Huck), U.S. Appl. No. 14/676,109.

* cited by examiner

FIG. 1A
140
192
192
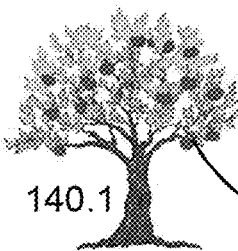
140.1
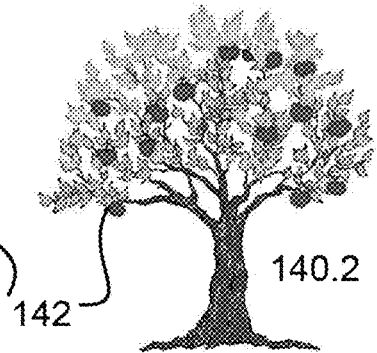
142   140.2
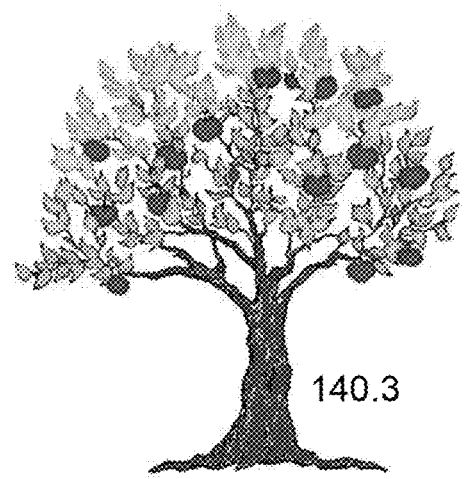
140.3
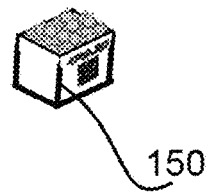
150
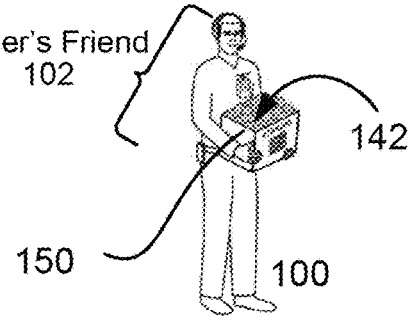
Farmer's Friend
102
142
150   100
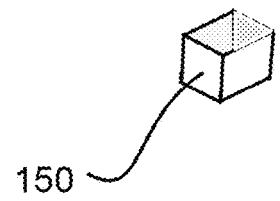
150
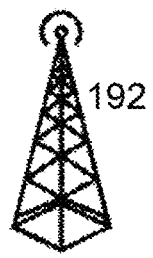
192
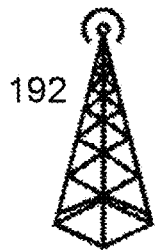
192

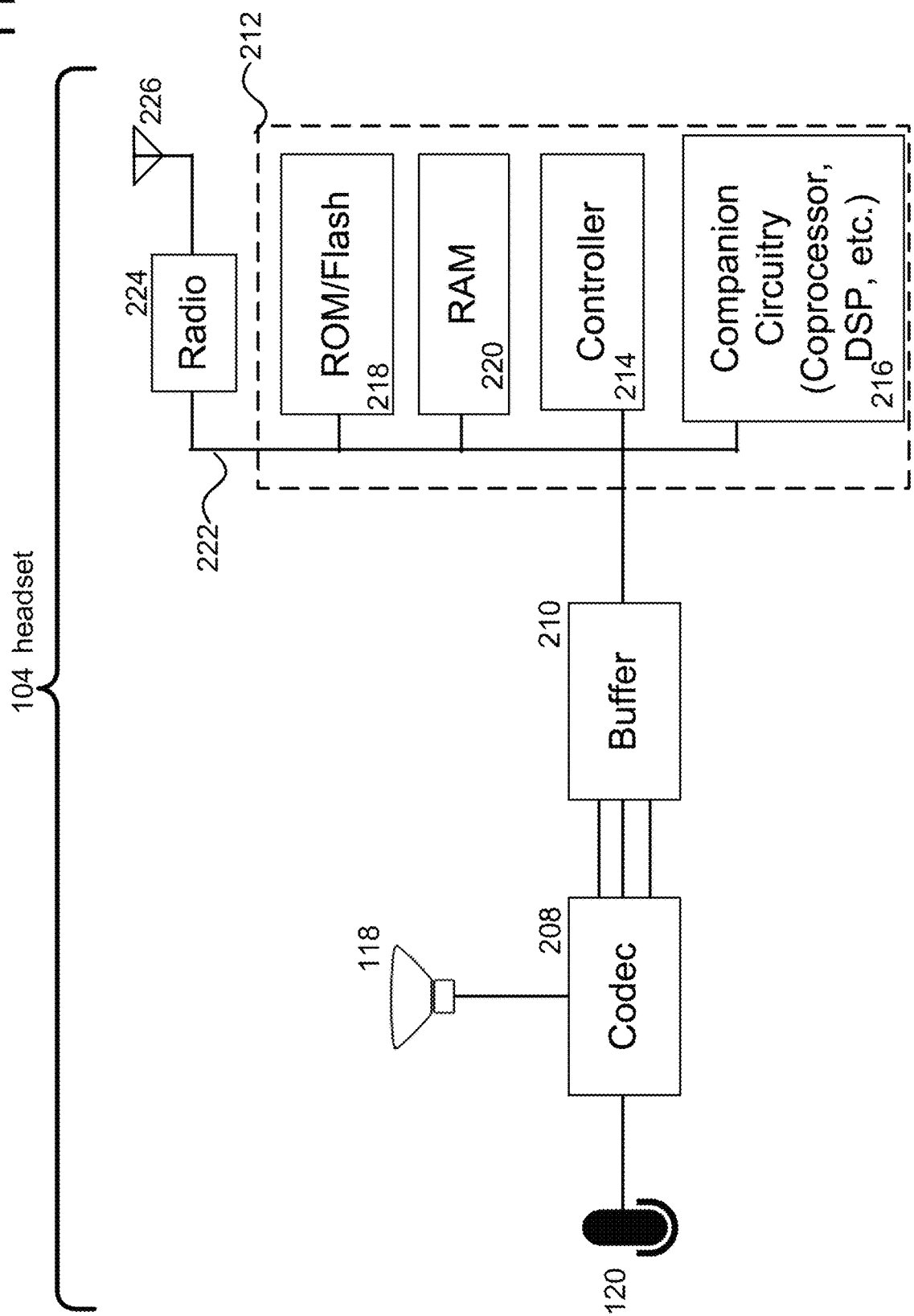

FIG. 6
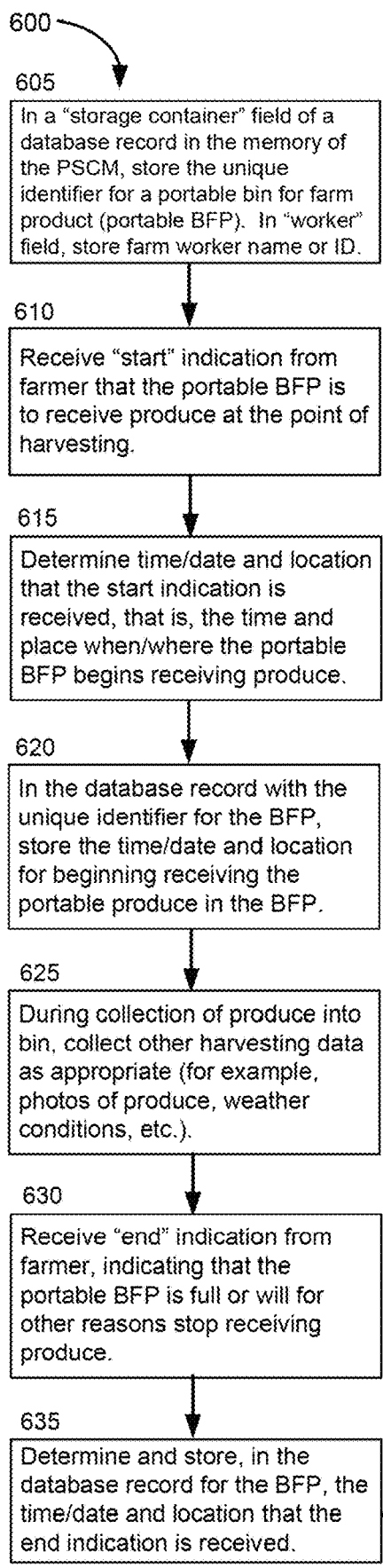
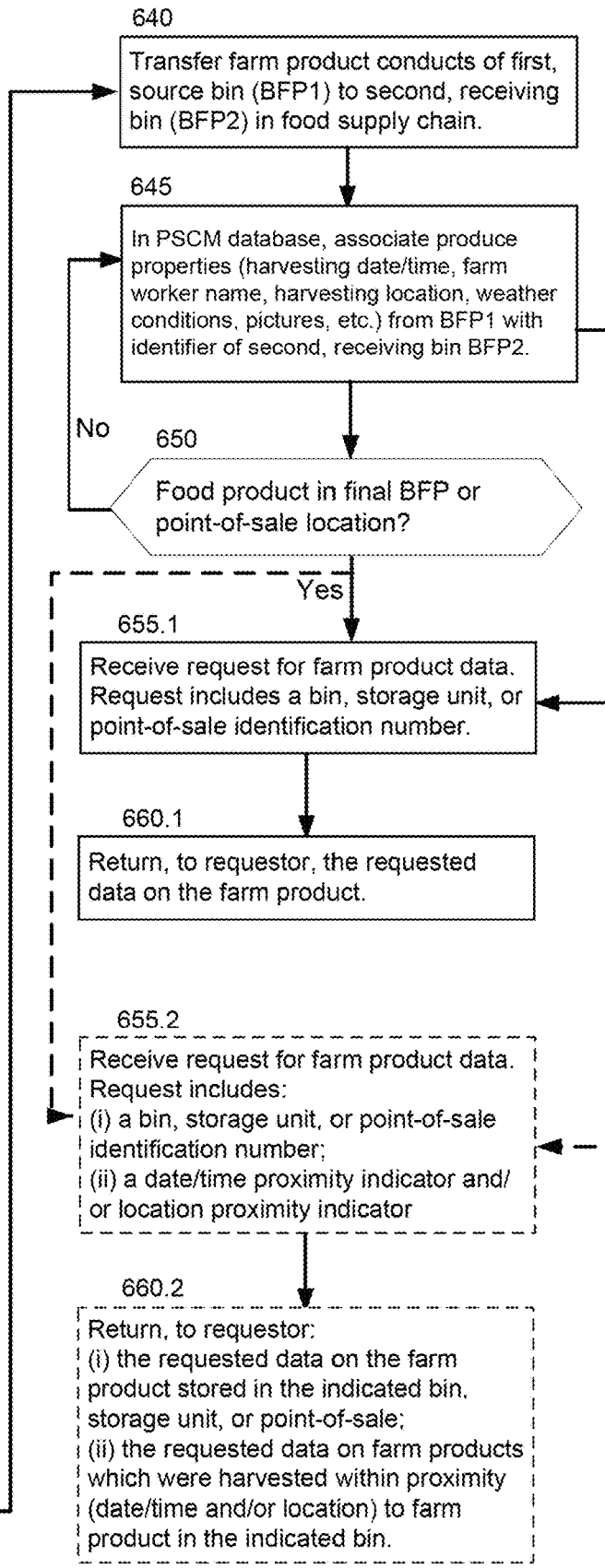

SUPPLY CHAIN TRACKING OF FARM PRODUCE AND CROPS

FIELD OF THE INVENTION

The present invention relates to a method and apparatus for product recognition, inventory tracking, and monitoring; and more particularly, to a method and apparatus for tracking and quality monitoring farm produce and other farm crops from their point-of-origin in the field to their point-of-processing and/or point-of-sale.

BACKGROUND

For food consumers, food producers, and government regulatory agencies alike, food safety is an ever-growing concern. One reflection of this is the U.S. Food Safety Modernization Act (FSMA), legislation signed into law by President Obama on Jan. 4, 2011. The U.S. Food and Drug Administration (FDA) states in a fact sheet on its web site (http://www.fda.gov/Food/GuidanceRegulation/FSMA/ucm239907.htm), "Background on the FDA Food Safety Modernization Act (FSMA)":

"The FDA Food Safety Modernization Act (FSMA) . . . enables FDA to better protect public health by strengthening the food safety system . . . . Mandatory produce safety standards: FDA must establish science-based, minimum standards for the safe production and harvesting of fruits and vegetables . . . . New authorities include: 1 . . . . Enhanced product tracing abilities: FDA is directed to establish a system that will enhance its ability to track and trace both domestic and imported foods. In addition, FDA is directed to establish pilot projects to explore and evaluate methods to rapidly and effectively identify recipients of food to prevent or control a food-borne illness outbreak." (Bold emphasis added.)

Even as this document is being prepared (May/June 2016), the FDA has established regulations under the FSMA, and is engaged in further active rulemaking to implement the FSMA. For more information on the FSMA and related rulemaking, see also http://www.pma.com/topics/food-safety/fsma.

The FSMA is expected to touch every segment of the produce business from farm to fork. "Produce" is a general term for a group of farm-produced crops and goods, especially fruits and vegetables, but possibly also including meats, grains, oats, etc. The term "produce" commonly implies that the farm products, as presented to consumers in stores, are fresh and generally in the same state as where they were harvested.

Rules are that are affected by the FSMA pertain to, among other areas: 1. Preventive Control Rules for Human Foods; 2. Sanitary Food Transportation Regulation; and 3. Traceability Regulations (yet to be proposed).

An organization called GS1 serves businesses in twenty-five industries in the United States by facilitating industry initiatives, and administrating the GS1 System of standards. GS1 develops and implements industry and company-level solutions and standards to optimize business processes, including supply chain management standards. (See http://www.gs1us.org/ for more information.) Among those standards have been voluntary produce traceability initiatives with GS1 marking requirements. (See https://www.gs1us.org/gs1_us_search?q=fresh%20foods %20booklet for more information.)

Under the FSMA, GS1 marking requirements or similar requirements may become legally required. These requirements could be driven by the retailers (through liability concerns) or by new regulations. (See https://www.youtube.com/watch?v=K-sOQJHytxk for a video with more information.)

Further, in addition to government requirements and regulations, safety- and health-conscious consumers and consumer organizations increasingly call upon food producers to ensure and enhance the safety of the food chain.

As indicated in the quoted material above, one area of concern is the safety of produce, typically fruits and vegetables. Fruits and vegetables are subject to diseases and are exposed to numerous chemicals (fertilizers and others), and are potentially subject to spoilage during shipment.

Ideally, then, food producers should be able to provide a detailed accounting of produce and environments to which the produce is subject, from first picking on the farm, through the entire transport and processing chain, and straight to the consumer end consumer. This is especially desirable for produce which will reach the end consumer with little or no processing—that is, raw fruits and vegetables for direct consumer consumption. However, tracking can also be valuable for fruits and vegetables which are to be processed (chopped, pureed, or otherwise modified) and mixed with other ingredients.

As produce is often farmed and transported by persons who may not be experts in data management or data tracking, there is a challenge in recording and maintaining a record of produce from point of origin to point of processing or point of sale.

What is needed, then, is an improved system and method for recording and tracking data pertinent to the quality of produce which is grown and harvested on a farm, and maintaining a track of that data from the harvesting on the farm to at least a designated point-of-processing, and more typically to the point-of-consumer-sale.

SUMMARY

In modern production environments, such as factories, it is increasingly common for human operators to be able to record data and to engage in manual activities in a "hands-free" data mode, typically via speech control. This typically entails the use of portable electronic voice-processing devices which can detect human speech; interpret the speech; and process the interpreted speech to recognize words, to record data, and/or to control integrated or nearby electronic systems.

Voice-driven systems typically include at least one microphone and at least one hardware processor-based device (e.g., computer system) which is operated in response to human voice or spoken input, for instance spoken commands and/or spoken information.

In many of these exemplary applications it is also advantageous or even necessary for the human operators to be mobile. For applications in which mobility is desirable, the human operators may wear a headset and a portable processor-based device.

For reasons which will become apparent below, the portable processor device is also referred to in this document as a Produce Supply Chain Monitor (PSCM) field device. The headset typically includes at least one loud-speaker and/or microphone. The portable processor-based device typically takes the form of a wearable computer system. The headset is communicatively coupled to the portable processor-based device, for instance via a coiled wire or a wireless connection, for example, a Bluetooth connection.

In some applications, the portable processor-based device (PSCM field device) may in turn be communicatively coupled to a host or backend computer system (e.g., server computer). For reasons which will become apparent below, the backend server is also referred to in this document as the PSCM server. In many applications, two or more portable processor-based devices (clients) may be communicatively coupled to the host or backend computer system/server.

The server may function as a centralized computer system providing computing and data-processing functions to various human workers via respective portable processor-based devices and headsets.

Applications to Farming and Food Chain Monitoring:

Such voice-driven systems can also be used to enhance monitoring of the food chain. To be advantageously employed in a farming environment, such voice-driven system may benefit from enhancement by attachment or inclusion of various environmental sensors, which can record data pertinent to food safety. They may also benefit from the addition of bin, container or barrel marking tools to label produce harvesting bins/containers/barrels; or a barcode reader or RFID reader to read a barcode or RFID tag already associated with a bin and used to identify the bin. Other elements may be included as well.

Accordingly, in one aspect, present system and method is also referred to in this document as a Produce Supply Chain Monitor system and method, or PSCM. A produce supply chain monitor system may be used by produce and farm industry workers, providing them with the tools they needed to meet all of the emerging FSMA regulations, while keeping their and hands and eyes free to do their jobs. In an embodiment, the system and method features electronics and supporting software which are to be worn in the field by a farm-worker, the system including:

(i) a wearable speech recognition headset or a headset with microphone coupled to a processor-based device, also known as a PSCM field device, which includes speech recognition capabilities;

(ii) a wide-area-network (WAN) radio enabling communication between the farm workers and central servers; in an alternative embodiment, the PSCM system and method may use cellular communications (substantially similar to that used in consumer cell phones) to upload data to a central data server, or PSCM server. In an alternative embodiment, the system may feature means to upload data to a central server via a wired-connection or via a shorter-range wireless connection (for example, a wireless local area network (WLAN) which may be based on 802.11 (Wi-Fi) protocols.);

(iii) a location assessment system, for example, GPS receivers, to identify the location where produce is first picked;

(iv) a marking tool to mark and identify produce storage units, such as harvesting crates or bins, which hold the freshly picked produce; an alternative embodiment may employ a crate-scanning tool to detect existing identification markers on harvesting bins; and (v) suitable application software to support all the above.

In another aspect, the present system and method, also referred to herein as a produce supply chain monitor (PSCM) system and method, solves the problem by integrating elements which may include a voice-enabled mobile supply chain tracking system, a location sensor, for example a GPS sensor, and possibly other sensors such as video or a camera to record the condition of fruit or vegetables at the time of picking. Other sensors may be used as well.

The PSCM system records produce data at the time of picking, and associates the data with a suitable tracking number, for example a harvesting bin number (for a harvesting bin with multiple samples of the produce from a common source, such as a common tree) or even a label number associated with individual produce. Data may be recorded visually, or as voice information by the farmer picking the produce. Data may be transmitted from the point of picking to a central server via a wide area network.

The information is transmitted to a central server or other central PSCM processor. If the tracking method for the produce is maintained (even across transfers to various transportation or point-of-sale containers) for the duration of the food chain, then origin information can readily be obtained for produce at the processing or consumer end of the food chain.

Accordingly, in another aspect, the present system and method solves the problem by integrating software-based monitoring and control into the food chain and its associated farming, transport, and food processing processes. The software integrates elements which may include a mobile supply chain tracking system that includes voice recognition capabilities, a location sensor, for example a GPS sensor, and possibly other sensors such as video or a camera to record the condition of fruit or vegetables at the time of picking. The software may make operable other sensors which may be employed as well. The software directs the food supply chain system to record produce data at the time of picking, and to associate the data with a suitable tracking number. The tracking number may for example be a harvesting bin number (for a harvesting bin with multiple samples of the produce from a common source, such as a common tree) or even a label number associated with individual produce. The software may direct the system to record data visually, or as voice information by the farmer picking the produce, or as a text transcription of the voice information provided by the farmer.

Distribution and Availability of Produce-Related Information:

The software is so configured that produce-related information is transmitted to a central server or other central processor. If the software maintains the tracking method for the produce for the duration of the food chain, then origin information can readily be obtained for produce at the processing or consumer end of the food chain.

For example, sometimes diseases are discovered in produce which is already in the marketplace (that is, on sale or sold to consumers). Currently, it may be difficult or impossible to identify exactly when the diseased produce was picked and/or where it was picked.

With the present system and method, in the event that produce is found, at some point, to be diseased or contaminated, the point of original can be identified, along with other produce harvesting bins that were obtained as the same location. In this way, sources of disease or contamination can be readily identified and isolated.

BRIEF DESCRIPTION OF THE DRAWINGS

At points throughout this document as appropriate, FIGS. 1A and 1B may be referred to collectively as FIG. 1.

FIG. 1A is a view of an exemplary produce orchard where the present system and method may be applied.

FIG. 2 is a system diagram of an exemplary headset which is identical or similar to that of FIGS. 1A and 1B, according to one exemplary embodiment of the present system and method.

FIG. 6 is a flow chart of an exemplary method for monitoring a produce supply chain.

DETAILED DESCRIPTION

In the following description, certain specific details are set forth in order to provide a thorough understanding of various embodiments. However, one skilled in the art will understand that the invention may be practiced without these details. In other instances, well-known structures associated with supply chain monitoring and reporting, voice recognition systems and PSCM field devices, position determination systems, network systems, cleaning and treatment application, and pack marking tools have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Figure 1B:
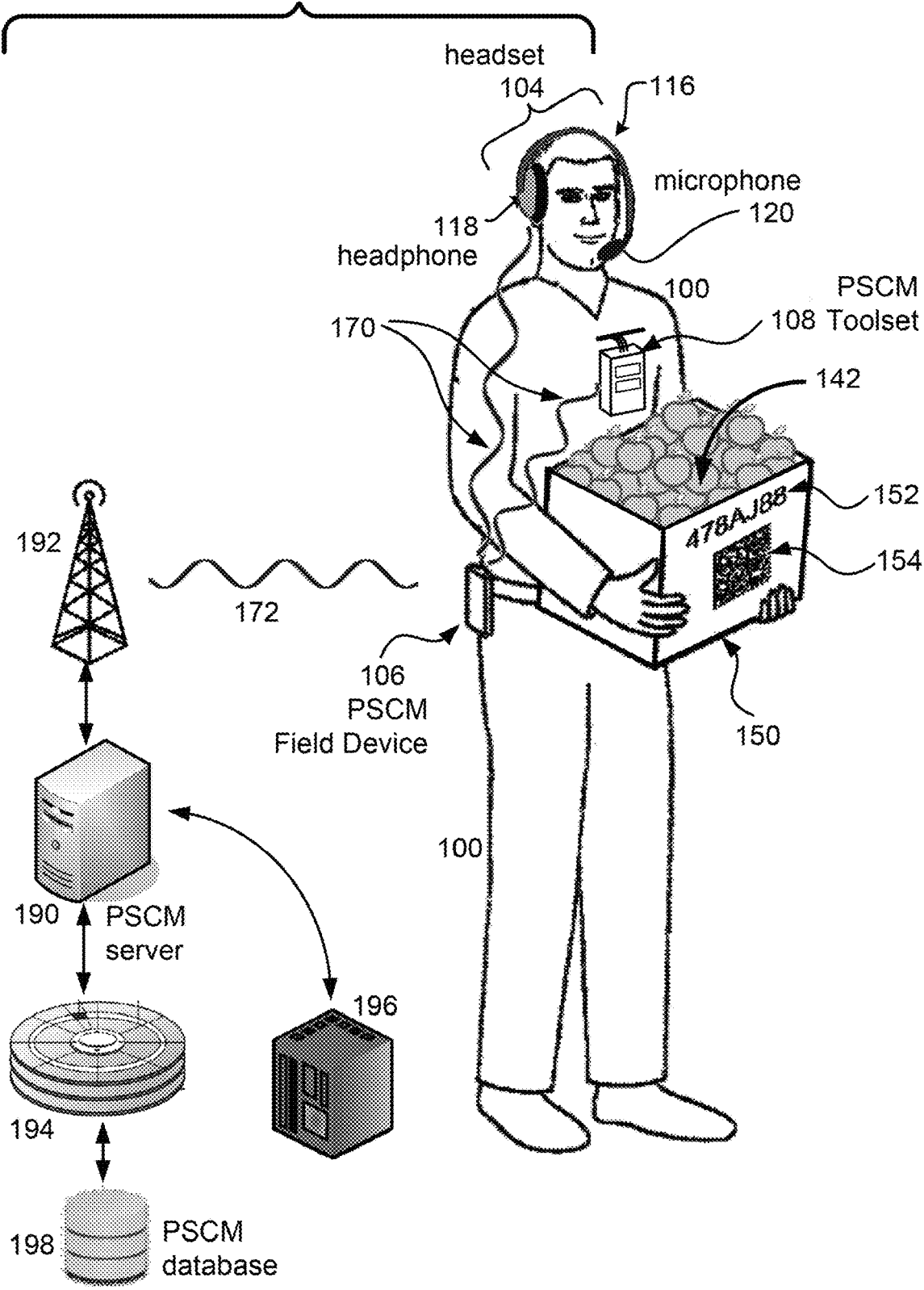
FIG. 1B is a view of an exemplary produce supply chain monitor (PSCM) according to one exemplary embodiment of the present system and method.

At points in this document, FIGS. 1A and 1B are referred to collectively as FIG. 1.

Processors:

It will be noted that, throughout this document, reference is made to "processors" or "hardware processors". The two terms are generally used interchangeably. Persons skilled in the relevant arts will recognize that, in general, data processing may be implemented and performed via (1) dedicated hardware (e.g., task-specific signal processors), (2) via a combination of general purpose processing hardware (e.g., microprocessors) and computer instructions (code) which may be stored in firmware, volatile memory, and/or non-volatile memory, or (3) combinations of categories (1) and (2) above.

Throughout this document, including the appended claims, both the terms "processors" and "hardware processors" generally refer to any of categories (1), (2), and (3) above, it being understood that at least some hardware processing capability (dedicated or general purpose) is subsumed under both of these terms.

Time and Date of Harvesting:

Throughout this document, including the appended claims, references may be made to a "time of harvesting" of farm produce, a "date of harvesting" of farm produce, and/or a "time and date of harvesting" of the produce. Persons skilled in the art will appreciate that, generally, at least a date of harvesting will be considered pertinent data regarding produce harvesting, but that a more specific time of day may be of interest as well; and further, that in some cases primarily a time of harvesting (and possibly not a date) may be of interest. Therefore, and unless otherwise specified, references throughout this document, including in the appended claims, to either a "time of harvesting" or to a "date of harvesting" will be understood to be equivalent to "a date and/or time of harvesting."

Overview of The Farmer's Friend (FF) or Produce Supply Chain Monitor (PSCM)-Electronic System(s) and Method(s) for Produce and Other Farm Product Supply Chain Sensing, Monitoring and Data Management The present system and method embraces electronic devices designed to aid in the monitoring of the supply chain of farm products, especially but not exclusively produce (fruits and vegetables, and possibly other farm products which may be presented fresh to the consumer). The system and method is referred to for convenience herein, and equivalently throughout, as the Produce supply chain monitor (PSCM), the Farmer's Friend (FF), or, at points, simply as "the present system and method".

The Produce supply chain monitor (PSCM) creates a hands free, eyes free, voice solution for produce industry workers. Elements and advantages of the system and method include:

(i) Paperless who, what, when, where, documentation for picking and packing, including for example and without limitation: who picked the produce; what produce was picked; when was the produce picked (date and time); and where was the produce picked (not just the farm but, in an exemplary embodiment, GPS coordinates specific to the granularity of a specific tree in an orchard);

(ii) Maintenance/Inspection tools to meet regulatory requirements—in an embodiment, inspection tools may be included with the FF. In an alternative embodiment, the FF provides audio-guided direction and documentation for third-party maintenance and inspection tools;

(iii) Produce Cleaning/Treatment Application—In an embodiment, the system provides audio guided direction and documentation to produce workers for produce cleaning and treatment;

(iv) Point of pack marking tool(s) to mark harvesting bins, barrels, or other containers that hold picked produce—this provides for identification and traceability for produce, and may include labels, ink spray devices, burning/laser marking mechanisms, or possibly other marking tools.

(v) Producers of produce have the most information available at the time of harvesting and the point of harvesting. By collecting as much information as possible at the time and location of harvesting, sources of diseased fruit can be more readily identified and localized. In turn, this means that when diseased produce is identified, the related produce—produce harvested nearby at the same time—can be readily identified and isolated. This reduces the amount of produce which must be disposed of due to possible disease.

The discussion below proceeds in sections. Presented first is a discussion of an exemplary electronic system which may be employed in an embodiment of the present system and method. Following that is a discussion of an exemplary farm workflow, describing an exemplary application of the Farmer's Friend.

The Farmer's Friend, also referred to as a Produce supply chain monitor (PSCM), is a system designed to support the tracking of produce and other farm products, from point of harvesting on the farm to later stages in the produce and supply chain. In an embodiment, the PSCM may support produce tracking up to and including the including the presentation of the produce to consumers in the market.

In an embodiment, the tracked data includes time and location data for harvesting.

In an embodiment, the tracked data includes various kinds of environmental and quality data regarding the produce, including for example and with limitation: visual images of the produce as harvesting; a record of applied fertilizers; a record of other applied chemical treatments (for example, pesticides); soil quality data; weather data, local insect population data; the name of the produce worker who harvested the produce; a record of activities to clean and sanitize harvesting equipment and the cleaning methods or chemicals used, along with identification of specific equipment which has been sanitized on specific dates and times; and other pertinent information.

In an embodiment, the tracked data includes an identifier (ID) for the individual farm worker or field worker who picked or harvested the produce. This may be useful for many reasons, including for example the possibility that the farm worker may have carried a plant disease (picked up for example from one plant) to other plants. The identifier may for example and without limitation be in the form of the farm worker's name, a worker ID number, or both.

In an embodiment, the Farmer's Friend may receive the ID as a vocal statement from the farm worker. In an alternative embodiment, the Farmer's Friend may receive the ID by scanning an identifier, such as an RFID tag or bar code, which is part of an identification card carried by the farm worker. In an embodiment, the Farmer's Friend may provide prompts, such as audio prompts or visual prompts, prompting the field worker to provide his or her name or ID, or to position an ID card for reading by the device.

PSCS Field Context and Usage

Produce is often harvested by individual workers, for example, farm workers who pick apples, grapes, or similar produce. Such persons are referred to herein as produce field workers 100. The produce field worker 100 may, in this document, be equivalently referred to as the farmer, field worker, field user, or simply as the worker or user 100.

FIG. 1A shows an exemplary produce field worker 100 in an exemplary produce orchard 140, with a produce storage unit 150, in this instance a harvesting crate 150, or other storage unit 150, which stores freshly picked/harvested produce 142. Such produce storage units 150 are referred to in this document, equivalently, by several different terms: harvesting bins, harvesting crates, harvesting barrels, harvesting boxes, bins for farm product (BFP, as per FIG. 6), or harvesting containers 150. (They may also be referred to in the art as: field packing containers, bins, boxes or crates, though such usage is not generally employed herein.)

The produce worker 100 is wearing some elements of the Farmer's Friend 102 (referred to equivalently as a produce supply chain monitor 102) according to one embodiment of the present system and method. The produce worker 100 may be working in an exemplary produce orchard such as an exemplary apple orchard 140. Orchard 140 typically includes multiple trees 140.1, 140.2, 140.3, etc. (collectively 140.n, n=1, 2, 3, etc.) or other multiple plants 140.n which provide fruits (e.g., grape vines, etc.) Produce storage units such as harvesting boxes, barrels, bins 150 or other similar harvesting containers 150 may be used to hold and store the produce 142, such as apples 142, as they are picked.

The present system and method may entail the use of a wireless networking system to obtain data from field workers 100. The wireless networking system may include one or more antennas 192 positioned about the orchard 140.

FIG. 1B shows an exemplary Farmer's Friend, or produce supply chain monitor (PSCM) 102, according to one embodiment of the present system and method. PSCM 102 includes a headset 104 and a hardware processor-based PSCM field device 106. In use, the produce field worker typically wears the headset 104, and optionally wears the hardware processor-based PSCM field device 106. In an embodiment, the produce supply chain monitor 102 may also include a PSCM toolset 108, which may provide a variety of supporting sensor and tools discussed further below. In an embodiment, the PSCM toolset may optionally be worn by the field worker 108.

In an embodiment, the PSCM toolset 108 may be structurally designed to be readily taken in hand by the user 100, for purposes of putting the tool or tools 108 to work in a variety of ways. For example, in an exemplary embodiment, the toolset 108 may include a camera for recording the images of sample harvested produce 142, and may also include a marking device for marking produce harvesting crates 150. Although just one toolset element 108 is depicted in FIG. 1B, in an embodiment the PSCM may include multiple tools or toolsets 108. In an alternative embodiment (not illustrated), the tool or tools 108 and the PSCM field device 106 may be integrated into a single structural device.

The hardware processor-based PSCM field device 106 is communicatively coupled, either directly or indirectly, with the headset 104. For example, the hardware processor-based PSCM field device 106 and headset 104 may be wirelessly communicatively coupled via one or more radios (e.g., transmitters, receivers, transceivers) as indicated by radio frequency signal 170. In an embodiment, for such a wireless personal area network (PAN), radio technologies operating according to Bluetooth protocols and hardware may be employed. Other PAN wireless technologies may be employed as well. Alternatively, the hardware processor-based PSCM field device 106 and headset 104 may be communicatively coupled via one or more cables, for instance one or more wire or optical cables (not shown).

Similarly, the hardware processor-based PSCM field device 106 and the PSCM toolset 108 are communicatively coupled, either directly or indirectly. In an embodiment, the headset 104 and PSCM toolset 108 may also be communicatively coupled (not illustrated), either directly or via the PSCM field device 106 as an intermediary. In this way, even if the field worker 100 needs to hold the toolset 108 in hand for certain tasks, task control and operations may still be controlled via voice command via microphone 120.

Optionally, the produce supply chain monitor 102 may also include one or more backend computer systems 190 (only one shown), which may include or be communicatively coupled to one or more data stores 198 stored on one or more non-transitory computer- or processor-readable media 194. The media 194 may hold a PSCM database 198, for example a relational database, which may store data pertinent to the harvesting of the produce 142. Exemplary contents or data within such a database 198 are discussed further below in this document.

In turn, the backend computer system(s) 190 is or are communicatively coupled to one or more hardware processor-based PSCM field devices 106. For example, a wireless networking system may include one or more antennas 192 (only one shown) positioned about the orchard 140. Antenna 192 can provide wireless communications (for example, by radio frequency signal 172) between the one or more processor-based PSCM field devices 106 and the one or more backend computer system(s) 190.

The produce field worker 100 may engage in various activities which may require the use of the produce field worker's hands, for instance to pick produce 142, to load the produce 142 into harvesting bins 150, or to use other farm implements or tools. Alternatively, the activities (such as simply reporting farm or produce conditions), may not require use of the produce field worker's hands; however hand-free operation may be more comfortable or otherwise advantageous for the produce field worker 100.

The headset 104 may include a headband 116, one or more loud-speakers or headphones 118 (one visible in FIG. 1B), one or more microphones 120 (one visible in FIG. 1B), and internal circuitry (not illustrated). The headband 116 allows the headset 104 to be securely worn by the produce field worker 100, and positions the loud-speaker(s) 118 at least proximate one ear (or next to each ear, if two are used) of the produce field worker 100. The microphone 120 may be positioned proximate and oriented toward a mouth of the produce field worker 100 when the headset 104 is worn.

The circuitry (not shown in FIG. 1B, see FIG. 2) of the headset 104 may incorporate audio processing circuits such as audio filters and correlation circuitry associated with speech detection and/or speech recognition.

The processor-based PSCM field device 106 may be portable or stationary. For example, the processor-based PSCM field device 106 may be worn by the produce field worker 100, for instance on a belt as illustrated in FIGS. 1A and 1B. This allows the headset 104 to use relatively short range wireless communications devices, for instance Bluetooth radios, while ensuring that communications between the headset 104 and the processor-based PSCM field devices 106 is maintained during normal use.

Alternatively, the processor-based PSCM field device 106 may be manually carried or otherwise transported, for instance on a vehicle (e.g., fork lift, tug). Alternatively or additionally, the processor-based PSCM field device 106 may be stationary. Such implementations may employ a plurality of antennas positioned throughout a work environment and/or sufficiently more powerful communications devices, for instance WiFi radios.

Similarly, in an alternative embodiment, some or all elements of PSCM toolset 108 may be stationary. For example, cameras to record produce quality may be positioned at points in an orchard 140, but their use may be initiated via voice command. Similarly, bin marking stations may be situated at points throughout an orchard 140, but their function may be initiated and controlled via voice command, via headset 104 and microphone 120.

The circuitry (not shown in FIG. 1B, see FIG. 3) of the processor-based PSCM field device 106 may incorporate audio processing circuits for tasks such noise suppression and modeling, features vector generation, decoding, and other circuitry associated with speech detection and/or speech recognition. The processor-based PSCM field device 106 may also incorporate hardware and/or software to control PSCM toolset 108, to obtain and store data from PSCM toolset 108, to record audio data obtained from worker 100, and to issue instructions to worker 100 in response to various environmental conditions or in response to actions or previous voice commands from field worker 100.

The headset 104, toolset 108, and processor-based PSCM field device 106 permit various produce field workers 100 to communicate with one or more backend computer systems 190 (e.g., server computer systems). In an embodiment, the processor-based PSCM field device 106 receives digital instructions from the backend computer system 190 and converts those instructions to audio, which is provided to the produce field worker 100 via loud-speaker(s) 118 of the headset 104. The produce field worker 100 provides spoken input via the microphone 120 of the headset, which the processor-based PSCM field device 106 may convert to a digital format (e.g., words, text, or digital encoding(s) which are symbolic of words and text) to be transferred to the backend computer system 190.

The backend computer system(s) 190 may be part of a larger system for sending and receiving information regarding the harvesting of produce 142, the condition of produce 142, and the activities and tasks to be performed by the produce field worker(s) 100. The backend computer system(s) 190 may execute one or more system software routines, programs or packages for handling particular tasks. Tasks may, for example, include tasks related to tracking the picking data and picking location of produce 142, and to storing data (such as weather data, photographic data, and other data) pertaining to produce 142.

In an embodiment, backend computer system 190 may be linked to other supporting computer systems, servers, or database systems 196 which provide supporting data, or which provide farm data access for third parties such as produce shippers, grocery stores, the U.S. Food and Drug Administration, the U.S. Department of Agriculture, the U.S. Center for Disease Control, and other third parties. These other server systems 196 may store, for example, data related to the use of pesticides or fertilizers on the farm, or data related to weather conditions at the time of produce harvesting or through the duration of produce planting and growth. In an embodiment, supporting servers 196 may be considered an element of the produce supply chain monitor 102. In an embodiment, functions of PSCM server 190 and supporting server 196 may be integrated into a single server, server system, or server farm (not illustrated). In an alternative embodiment, supporting servers 196 may not be an element of PSCM 102, but may be communicatively coupled to PSCM 102.

In an alternative embodiment of the present system and method, the backend computer system(s) 190 may implement some, or all, of the functionality otherwise described herein as being associated with the processor-based PSCM field device 106.

The backend computer system/server 190 may be any targeted computer or automated device, and may be located anywhere with respect to the produce field worker and the various components. For instance, the backend computer system 190 will typically be located remotely from the produce field worker, such as in a room or other facility on the farm or orchard 140.

However, the background computer system 190 may be located locally with the produce field worker, for instance carried or worn by the produce field worker or carried by a vehicle operated by the produce field worker. In some implementations, that backend computer system 190 may be combined with the processor-based PSCM field device 106.

Headset

FIG. 2 is a system-level diagram of some of the components of an exemplary headset 104, according to one exemplary embodiment of the present system and method. The headset 104 may be similar to or even identical to the exemplary headset 104 of FIG. 1.

The headset 104 includes a microphone 120, and may include one or more secondary microphones (not shown). The microphone 120 is operable as a transducer to convert acoustic energy (e.g., sounds, such as voice or other sounds) to analog signals (e.g., voltages, currents) that have respective signal levels indicative of the received acoustic energy. The headset 104 preferably includes at least one loudspeaker 118 (though two may be employed). The loudspeaker(s) 118 is operable as a transducer to convert analog signals (e.g., voltages, currents) that have respective signal levels into acoustic energy (e.g., sounds, such as received, recorded or artificially generated spoken syllables, words or phrases or utterances).

The microphone(s) 120 is (are) positioned or configured (e.g., directional and oriented) to primarily capture speech or utterances by the produce field worker 100.

The microphone 120 may be positioned such that when the headset 104 is worn by a produce field worker 100, the microphone 120 is positioned close to the mouth of the produce field worker 100. For example, the microphone 120 may be carried at an end of an arm/boom of the headset 104, positioning the primary microphone 120 proximate to the mouth of the produce field worker 100.

It will be noted that microphone(s) 120 may pick up environmental sounds other than or in addition to speech utterances by the field worker 100. Persons skilled in the relevant arts will appreciate that the present system and method may rely, in part or in whole, on signal processing techniques to distinguish produce field worker speech from environmental sounds, as well as from background speech by other nearby persons.

In an alternative embodiment, some implementations of the present system and method may employ additional secondary microphones (not shown), for example two or more secondary microphones, to help distinguish produce field worker speech from environmental sounds and/or background speech.

The headset 104 may include one or more audio coder/decoders (CODECs). For example, the headset 104 may include an audio CODEC 208 coupled to the microphone(s) 120 to process analog signals from the microphone 120 and produce digital signals representative of the analog signals. The CODEC 208, or another audio CODEC (not shown) may be coupled to the loud-speaker(s) 118 to produce analog drive signals from digital signals in order to drive the loud-speaker(s) 118.

The headset 104 may include one or more buffers 210. The buffer(s) 210 may temporarily store or hold signals. The buffer 210 is illustrated as positioned relatively downstream of the CODEC 208 in a signal flow from the microphone 120.

The headset 104 includes a control subsystem 212. The control subsystem 212 may, for example include one or more hardware controllers 214, one or more sets of companion circuitry 216, and one or more non-transitory computer- or processor-readable storage media such a non-volatile memory 218 and volatile memory 220.

The controller(s) 214 may take a variety of forms, for instance one or more hardware microcontrollers, hardware microprocessors, digital signal processors (DSPs), application specific integrated circuits (ASICs), programmable gate arrays (PGAs), graphical processing unit (GPUs) and/or programmable logic controllers (PLCs).

Optional companion circuitry 216 may take the form of one or more digital, or optionally analog, circuits, which may, or may not, be in the form of one or more integrated circuits. The controller(s) 214 may function as a main processor, with the companion circuitry functioning as a co-processor to handle specific tasks. In some implementations, the companion circuitry 216 may take the form of one or more digital signal processors (DSPs) or graphical processing units (GPUs).

Non-volatile memory 218 may take a variety of forms, for example one or more read only memories (ROMs), one or more writeable memories, for instance EEPROM and/or one or more FLASH memories. The volatile memory 220 may take a variety of forms, for example one or more random access memories (RAM) including static random access memory (SRAM) and/or dynamic random access memories (DRAM) for instance synchronous DRAM (SDRAM)).

The various controllers 214, companion circuits 216, volatile memories 218 and/or nonvolatile memories 220 may be communicatively coupled via one or more buses (only one shown) 222, for instance instructions buses, data buses, address buses, power buses, etc.

The controllers 214 and/or companion circuitry 216 may execute instructions stored in or by the non-volatile memories 218 and/or volatile memories 220. The controllers 214 and/or companion circuitry 216 may employ data, values, or other information stored in or by the volatile memories 220 and/or nonvolatile memories 218.

In an embodiment of the present system and method, the control subsystem 212 may incorporate audio filtering circuitry or implement audio filtering by way of a general purpose hardware processor which processes suitable instructions stored in non-volatile memory 218 or volatile memory 220. Audio filtering may, for example, implement signal processing or data comparisons to distinguish acceptable produce field worker speech from various background sounds and/or from speech from other nearby produce field workers. Audio filtering may rely upon a comparison of frames of speech provided from microphone 120, via codec 208 and buffer 210, with previously-established speech samples stored in non-volatile memory 218 or volatile memory 220.

Figure 3:
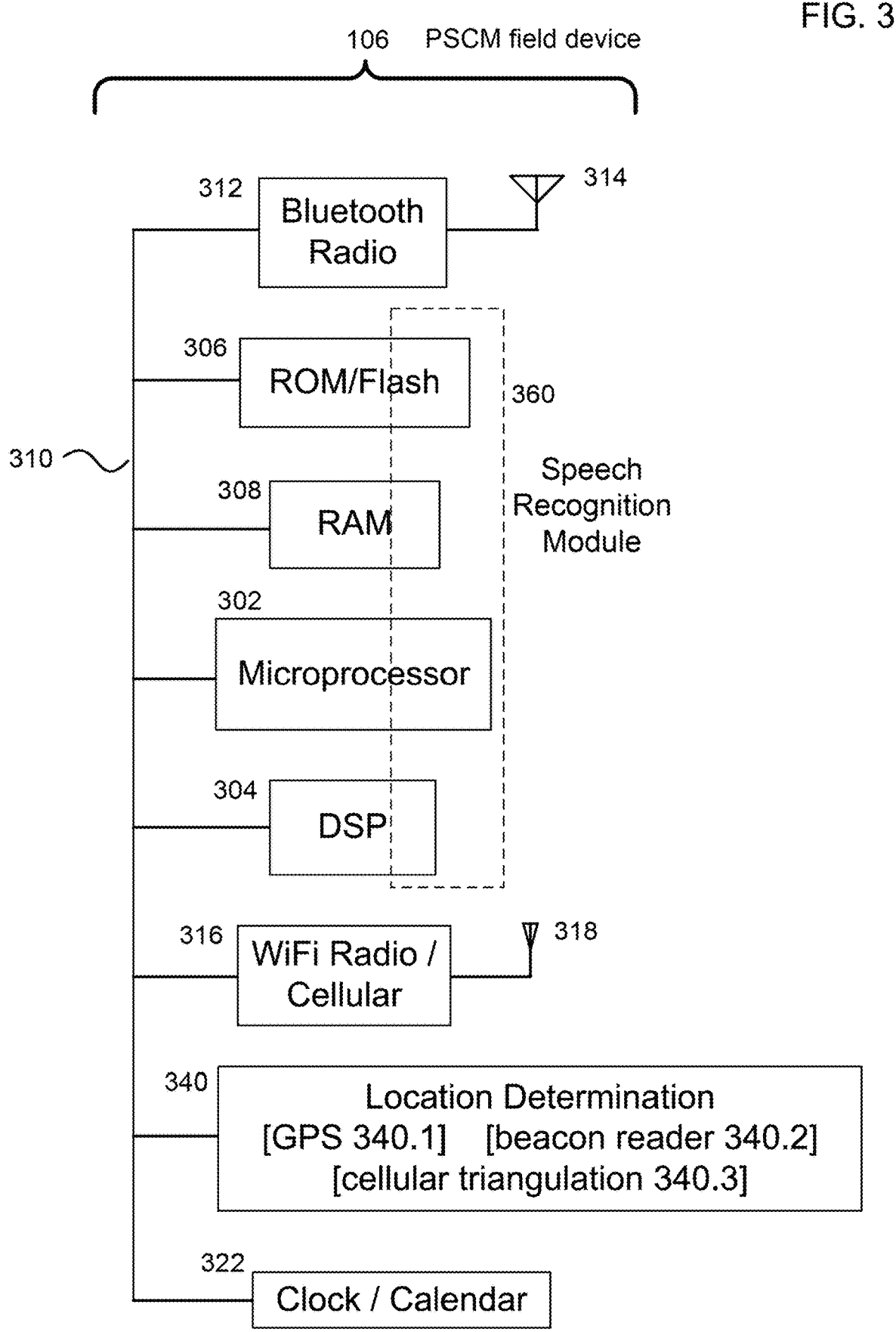
FIG. 3 is a system view of an exemplary hardware processor-based PSCM field device which is identical or similar to that of FIG. 1, according to one exemplary embodiment of the present system and method.

In an alternative embodiment of the present system and method, some or all audio filtering, speech-processing, and speech-comparisons may be instead be accomplished via circuitry on the PSCM field device 106 (FIG. 1 and FIG. 3). In an alternative embodiment, some or all audio filtering may be distributed between hardware and/or software of the headset 104, and hardware and/or software of the PSCM field device 106.

In an embodiment of the present system and method, the sound signal from the microphone 120 will be passed to the processor-based PSCM field device 106 for speech recognition. In an embodiment of the present system and method, the headset 104 first digitizes the speech using codec 208 and/or analog-to-digital converter circuits (not shown), and may then pass the digitized speech to the PSCM field device 106.

The headset 104 optionally includes one or more radios 224 (only one shown) and associated antennas 226 (only one shown) operable to wirelessly communicatively couple the headset 104 to the processor-based PSCM field device 106 and/or backend computer system 190. The radio 224 and antenna 226 may take a variety of forms, for example a wireless transmitter, wireless receiver, or wireless transceiver.

The radio 224 and antenna 226 may, for instance, be a radio suitable for short range communications, for example compatible or compliant with the BlueTooth protocol, which allows bi-directional communications (e.g., transmit, receive). Alternatively, the radio 224 and antenna 226 may take other forms, such as those compliant with one or more variants of the IEEE 802.11 protocols (e.g., 802.11n protocol, 802.11ac protocol). The radio 224 and antenna 226 may, for example, take the form of a soldered down WLAN module or Bluetooth small outline integrated circuit (SOIC) with a suitable internal or external antenna. RF communications cards are commercially available from a large number of vendors. The range of the radio 224 and antenna 226 should be sufficient to ensure wireless communications in the expected work environment, for instance wireless communications with a processor-based PSCM field device 106 worn by a same produce field worker as wears the headset 104.

Processor-Based PSCM Field Device

FIG. 3 is a system diagram of an exemplary hardware processor-based PSCM field device 106, according to one embodiment of the present system and method. The hardware processor-based PSCM field device 106 of FIG. 3 may be similar to or even identical to the processor-based PSCM field device 106 of FIG. 1.

In an embodiment, the processor-based PSCM field device 106 may provide all the hardware processing abilities, or a substantial portion of the hardware processing abilities, needed to support the operators of the field-worker-worn elements of the produce supply chain monitor 102.

Exemplary services provided by the PSCM field device 106 may include, for example and without limitation:

(i) Speech recognition of words spoken by the field-worker 100, such speech recognition to include recognizing both data provided orally by the field worker 100, system control commands provided by the field-worker 100, and prompts for information provided by the field-worker 100.

(ii) Generation of audio prompts, to be heard by the field worker 100, based on either or both of field-worker instructions stored on PSCM field device 106, and prompts or communications received from PSCM server 190. For example, as noted above, the PSCM field device 106 may prompt the field worker 100 who is harvesting the produce 142 for his or her name or other personal identifier.

(iii) Communications/local networking support for, and communications between, any and all of headset 104, PSCM toolset 108, PSCM server 190, and the PSCM field device 106 itself.

(iv) Determination of current time and/or date, which in an embodiment may be used for identifying the time and/or date of produce harvesting (for example, when prompted by field worker 100).

(v) Location determination to identify the location of harvesting of produce.

(vi) Recording/storage of other pertinent environmental data, as may be obtained from PSCM toolset 108.

(vii) Control of PSCM toolset, for example, control of a marking tool or tools used to mark harvesting crates 150 or to directly mark produce 142.

(viii) Data compression and/or data encryption, for example to compress photos of produce for transmission over a wide area network (WAN).

(ix) Transfer of harvesting data to PSCM server 190 for long-term storage and access by orchard management and interested third parties.

(x) Transfer of data to and/or from a field worker's individual data tag. A field worker 100 may carry their own individual data tag or ID card which, in an embodiment, may be part of the PSCM system (not illustrated in the figures); or which instead may be associated with some other farm activity data management system (for example, a personnel management system). The data card may hold pertinent field worker data such as the field worker's name or other identification, and possibly a tracking of the field worker's activities (such as hours worked, locations visited, etc.). The PSCM field device 106 (and/or the PSCM toolset 108, discussed below) may be equipped for data transfer between the field worker's data card and the PSCM field device 106. Such data transfer may be by various RF means, such as RFID, Bluetooth transmissions, or other means of short-range data transfer known in the art.

It will be noted that the services enumerated above are exemplary only. Other services may be envisioned within the scope and spirit of the present system and method. In alternative embodiments, some of the enumerated services may instead be handled by headset 104, PSCM toolset 108, or server 190.

In an alternative embodiment, PSCM field device 106 may be structurally integrated with PSCM toolset 108. In an alternative embodiment, PSCM field device 106 may be structurally integrated with headset 104.

The processor-based PSCM field device 106 may include one or more controllers, for example a hardware microprocessor 302 and DSP 304. While illustrated as a microprocessor 302 and a DSP 304, the controller(s) may take a variety of forms, for instance one or more microcontrollers, ASICs, PGAs, GRUs, and/or PLCs.

The processor-based PSCM field device 106 may include one or more non-transitory computer- or processor-readable storage media such as non-volatile memory 306 and volatile memory 308. Non-volatile memory 306 may take a variety of forms, for example one or more read-only memories (ROMs), one or more writeable memories, for instance EEPROM and/or or one or more FLASH memories. The volatile memory 308 may take a variety of forms, for example one or more random access memories (RAM) including static and/or dynamic random access memories. The various controllers 302, 304 and memories 306, 308 may be communicatively coupled via one or more buses 310 (only one shown), for instance instructions buses, data buses, address buses, power buses, etc.

The controllers 302, 304 may execute instructions stored in or by the memories 306, 308. The controllers 302, 304 may employ data, values, or other information stored in or by the memories 306, 308. The memories 306, 308 may for example store instructions or computer code which implements the services and methods (i) through (ix) enumerated immediately above, including but not limited to speech recognition, generation of audio prompts, inter-element communications/network support, time determination or support for time determination, location determination or support for location determination, control of PSCM toolset 108, and other services and software modules as may be needed to enable and support the present system and method.

The processor-based PSCM field device 106 optionally includes one or more radios 312 and associated antennas 314 (only one shown) operable to wirelessly communicatively couple the processor-based PSCM field device 106 to the headset 104 and/or to the PSCM toolset 108. Such radio 312 and antenna 314 may be particularly suited to relatively short-range communications (e.g., 1 meter, 3 meters, 10 meters). The radio 312 and antenna 314 may take a variety of forms, for example a wireless transmitter, wireless receiver, or wireless transceiver. The radio 312 and antenna 314 may, for instance, be a radio suitable for short range communications, for example compatible or compliant with the Bluetooth protocol. The range of the radio 312 and antenna 314 should be sufficient to ensure wireless communications in the expected work environment, for instance wireless communications with a processor-based headset 104 and PSCM toolset 108.

The processor-based PSCM field device 106 optionally includes one or more radios 316 and associated antennas 318 (only one shown) operable to wirelessly communicatively couple the processor-based PSCM field device 106 to the backend computer system/server 190 (FIG. 1B), for example via one or more orchard antennas 192 (FIG. 1) of a wireless network or communications system on the farm or orchard 140. The radio 316 and antenna 318 may take a variety of forms, for example a wireless transmitter, wireless receiver, or wireless transceiver.

The radio 316 and antenna 318 may, for instance, be a radio suitable for relatively longer range communications (e.g., greater than 10 meters), for example compatible or compliant with one or more variants of the IEEE 802.11 protocols (e.g., 802.11n protocol, 802.11ac protocol) or WiFi protocol. In an alternative embodiment, radio 316 and antenna 318 may employ hardware and software appropriate to implement communications over a cellular phone network. In many applications, the range of the radio 316 and antenna 318 should be sufficient to ensure wireless communications in the expected work environment, for instance wireless communications with one or more antennas 192 (FIG. 1B) positioned throughout the work environment.

Location Determination:

Location determination 340 enables the Farmer's Friend 102 to determine and identify where produce 142 has been harvested, down to a detailed location such as the resolution of individual tree 140.*n* locations. Such specific locations can then be associated with the harvesting bin(s) 150 in which the produce 142 (from a particular tree 140.*n*) is stored at the time and location of harvesting. Typically, a field worker 100 may take a new location measurement at least every time they start filling a new harvesting bin 150, or every time they move to a new location for picking (for example, to a new fruit tree 140.*n*).

In an alternative embodiment, the field worker 100 may speak the location of a tree (such as an apple tree) 140 into the microphone 120 associated with the PSCM field device 106. For example, each tree 140 may be marked or labeled with a unique tree number, sometimes referred to as a "check digit", which may be read and announced by the field worker 100. Alternatively, the PSCM system 102 may direct the field worker to begin harvesting at a designated tree 140.

PSCM field device 106 may contain one or more hardware processors 302, 304 and/or associated software code or modules 340 related to location determination. In an embodiment, PSCM field device 106 employs standard Global Positioning System (GPS) 340.1 technology to determine location. In an alternative embodiment, PSCM field device 106 uses a beacon reader 340.2 to identify location based on location signals from stationary location beacons (not illustrated in FIG. 1 or other figures) which are located at strategic points throughout orchard 140. In an embodiment, location beacons may be included as a component or aspect of WiFi access points (not illustrated in the figures) located strategically at points throughout orchard 140.

In an alternative embodiment, PSCM field device 140 may employ a cellular location module 340.3 which uses triangulation based on cell-phone towers to determine its location. In an alternative embodiment, multiple location methods (340.*n*, n=1, 2, 3, etc.) may be employed for redundancy, backup, error-checking, or improved accuracy. These embodiments for a location system or module 340 are exemplary only, and others may be envisioned as well within the scope and spirit of the present system and method.

In an embodiment, location is recorded any time a field worker 100 commands his system to make such a recording, such as when moving to a new tree 140.*n*. In an alternative embodiment, PSCM field device 106 automatically records location upon a determination that the field worker 100 has moved more than a designated distance, which may be user- or administrator-configurable. Other triggering events may be envisioned as well.

Clock Calendar:

PSCM field device 106 may have a clock/calendar module 322 to track the time and/or date of events, including the time and/or date of harvesting bins 150 of fruit or vegetables 142. Clock/calendar module 322 may be implemented as, for example and without limitation, an internal clock/calendar which need be set or calibrated only once or only occasionally, and which maintains an accurate tracking of time and date; or by means of reading the time and date from external data sources via WLAN, cellular, or other data sources and systems.

PSCM Field Device as Part of a Larger Portable System:

Person's skilled in the art will appreciate that PSCM field device 106 may be an element or module of a more general purpose portable computer. It will be understood that those elements of hardware and software (ROM 306, RAM 308, Microprocessor 302, DSP 304) which are dedicated to speech recognition may be understood as collectively functioning as a speech recognition module 360 of the PSCM field device 306.

Further Details of Speech Analysis:

Further details of speech analysis and recognition by produce supply chain monitor 102 and a PSCM field device 106, including some additional hardware elements, software or processing modules, and algorithms (including some elements of audio digitization, frame generation, audio decoding, speech vector generation, sound classification, hypothesis generation, confidence scores, and other elements) are known in the art; for further description see for example U.S. Patent Application Publication No. 2014/0278391, filed Mar. 12, 2013, to Braho and Hardek, which is hereby included herein by reference as if reproduced herein in its entirety.

PSCM Toolset

The Farmer's Friend, or PSCM 102, may employ a variety of tools 108 which aid in marking, monitoring, and tracking farm produce 142 from orchard 140 field harvesting to market.

Figure 4:
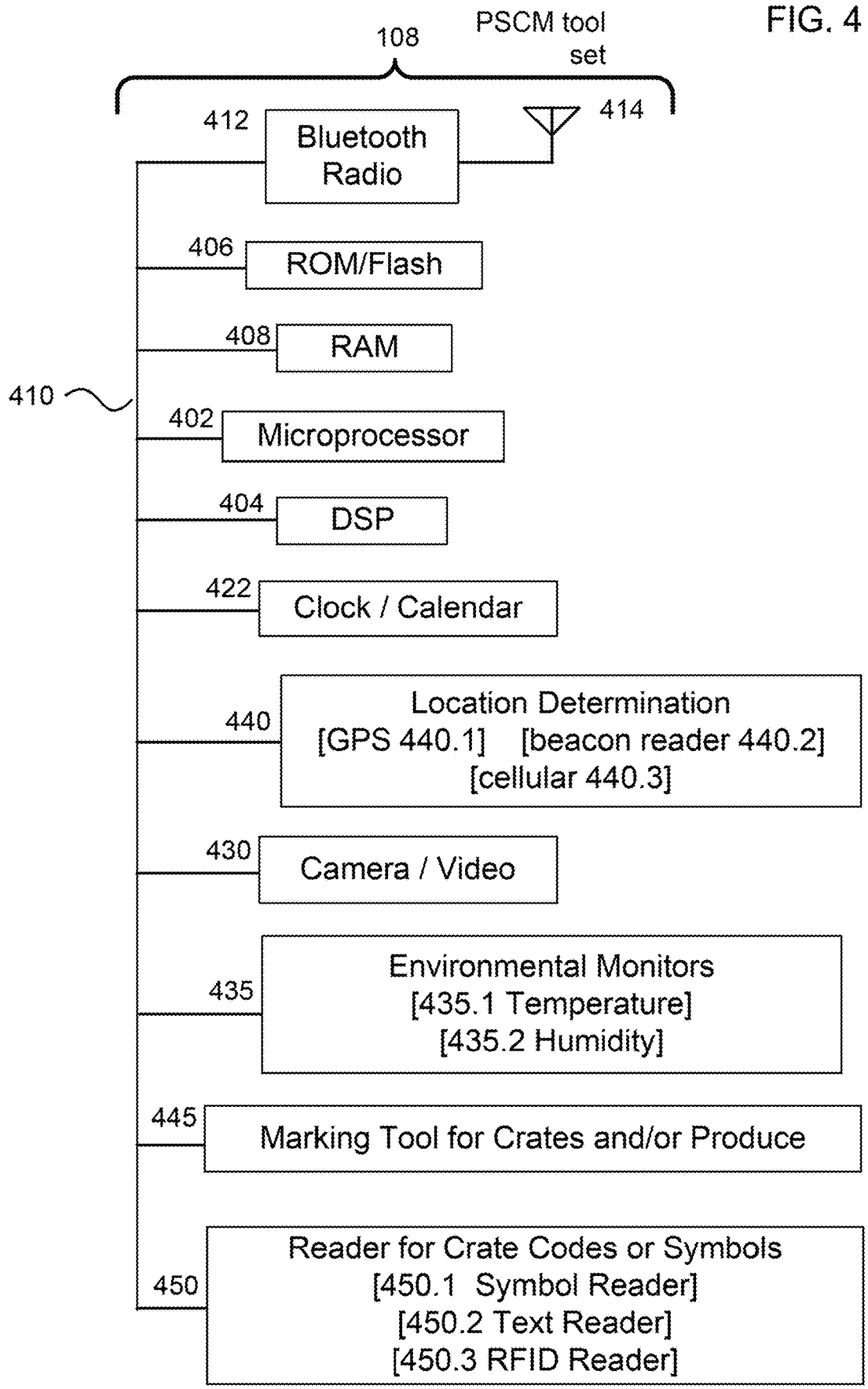
FIG. 4 is a system view of an exemplary hardware processor-based PSCM toolset which is identical or similar to that of FIG. 1, according to one exemplary embodiment of the present system and method.

FIG. 4 presents a system-level diagram of an exemplary PSCM toolset 108. As noted with respect to discussion of FIG. 1, a PSCM toolset 108 is an electronic device, tool or tools, with various possible embodiments. In an embodiment, PSCM toolset 108 is worn or carried by farm worker 100 but may be taken in hand by farm worker 100 when necessary for a task at hand. In an embodiment, multiple tools may be integrated into a single structural unit of a PSCM toolset 108.

In an alternative embodiment, the PSCM toolset may be comprised of multiple separate structural units (not illustrated in the figures) for different functions, including for example and without limitation: one structural units for marking harvesting crates 150; one structural unit for reading harvesting crate markings 152; one structural unit for photographing produce 142; one structural unit for monitoring weather or other environmental conditions. In an alternative embodiment, some functions may operate within a single, integrated structural unit, while one or multiple other functions may be operable in another integrated structural unit or units.

In an alternative embodiment, the PSCM toolset 108, or some elements of the toolset 108, may be designed not to be worn or held by farm worker 100, but may instead be configured to be integrated into various farm tools or farm vehicles, or other farm technologies; or may be designed for stationary, long-term, outdoor placement on an orchard or farm.

In an alternative embodiment, one or more functional elements of PSCM toolset 108 may be integrated into the structural unit of PSCM field device 106 or headset 104. For example, and without limitation: PSCM field device 106 may integrate location detection technology (340 in FIG. 3, and equivalently 440 in FIG. 4); headset 104 may integrate a camera or video recorded 430 for creating a visual record of harvested produce; or either of PSCM field device 106 or headset 104 may integrate a thermometer 435.1 for recording ambient temperate.

Digital Processing Elements:

The PSCM toolset 108 may include one or more of the following elements: non-transitory computer- or processor-readable storage media such as non-volatile memory 406 and volatile memory 408; a microprocessor 402; and a digital signal processor 404. These hardware elements may be implemented with hardware the same or substantially similar to analogous hardware described above in conjunction with headset 104 (FIG. 2) and/or PSCM field device 106 (FIG. 3), and detailed descriptions and hardware options will not be repeated here.

In general, these digital processing elements 420, 404, 406, 408 provide support for storage of software code, active use of software code, and processing of software code to run and support other operational elements of PSCM toolset 108, such as camera 430, weather and environmental monitor 435, location determination 440, marking tool 445, and symbol code reader or text/digit reader 450. These digital processing elements 420, 404, 406, 408 also provide support to record and store data, and for eventual data transmission, for environmental data obtained from sensing elements such as camera 430, weather and environmental monitor 435, location determination 440, and symbol code reader or text/digit reader 450. Persons skilled in the relevant arts will recognize that digital processing elements 420, 404, 406, 408 will store and process necessary computer code and/or firmware to support sensing and marking elements 430, 435, 440, 445, 450, the code/firmware configured and operable according the functions, operations, and methods described further herein.

Clock Calendar:

PSCM toolset 108 may have a clock/calendar module 422 to track the time and/or date of events including, for example and without limitation: the time and/or date of harvesting of fruit or vegetables 142 into bins 150; the time and/or date of recording environmental data; the time and/or date of taking photos; the time and/or date of marking harvesting bins 150.

In an embodiment, data from clock/calendar 422 may also be used, in conjunction with marking tool 445, to mark directly on harvesting bins 150 the date and/or time of picking produce 142. In an embodiment, clock/calendar module 422 may be implemented as, for example and without limitation, an internal clock/calendar which need be set or calibrated only once or only occasionally, and which maintains an accurate tracking of time and date; or by means of reading the time and date from external data sources via WLAN, cellular, or other data sources and systems. In an alternative embodiment, PSCM toolset 108 may rely on clock/calendar 322 of PSCM field device 106 for date and time information, such information communicated for example via Bluetooth radios 312, 412.

Communications Elements:

PSCM toolset 108 may also contain a Bluetooth radio 412 and associated antenna 414, and also possibly a WiFi and/or cellular communications system (not illustrated in FIG. 4) and associated antenna (also not illustrated in FIG. 4). These radio and communication systems provide support and functions similar to those of radios 224, 312, 316 already discussed above in conjunction with FIGS. 2 and 3, and details of the operation and implementation will not be repeated here.

In general, Bluetooth radio 412, antenna 414, and WiFi or cellular communications system provide support both for inter-device communication with other elements of produce supply chain monitor 102, including for example and without limitation PSCM field device 106, headset 104, and PSCM server 190.

Sensing and Action Tools

PSCM toolset 108 may include multiple sensing devices and action tools which support the functions of produce supply chain monitor 102, such functions being enumerated and taught throughout this document. Different embodiments of PSCM 102 may include varying combinations of one or more sensing devices and action tools, including for example and without limitation:

Location Determination:

A location determination module 340 was already discussed above in conjunction with FIG. 3, and the details of the discussion will not be repeated here. In an embodiment, location determination 440 is structurally integrated into one of more PSCM tool set 108 structures or bodies, rather than into PSCM field device 106, but the operations of location determination 340, 440 would be substantially the same or similar in such various embodiments. In an alternative embodiment, location determination 340, 440 is present and operable in two elements of PSCM 102, for example both PSCM field device 106 and PSCM toolset 108.

Environmental Monitors:

PSCM toolset 108 may include an environmental monitor 435 or monitors, for example a thermometer 435.1 to record the temperature at the time and points of harvesting, and/or hygrometer 435.2 to measure humidity at the time and point of harvesting.

In an alternative embodiment, PSCM 102 may not include environmental monitor(s) 435, and may instead rely on third-party databases (such as data available from the U.S. National Weather Service via the internet (www.weather.gov), or other internet-based sources) to obtain and record local environmental data at the time of harvesting. Such third-party data may have less localized position and time granularity than data recorded via dedicated environmental monitors 435, but the third-party data may still be sufficiently detailed for many purposes of analysis.

Camera/Video:

In an embodiment, PSCM toolset 108 may include a camera 430, video camera 430, or both, to capture and record produce quality at the time of harvesting. In an embodiment, photos or video may be recorded when prompted by the field worker 100 via voice command or via hand controls on PSCM toolset 108. Image or video data may be recorded, and time-stamped or otherwise correlated with place and time of recording, or with a harvesting bin identifier or symbol 152, 154, or with both. In an alternative embodiment, picture or video capture may be initiated automatically upon certain specified conditions, for example when the field worker 100 indicates collection of produce 142 into a new harvesting bin 150, and/or when image processing software determines that a tree 140.*n* or other produce-generating plant 140.*n* is in view of the camera 430.

Printer or Other Marking Tool for Identifying Produce Storage Units and/or Produce:

In an embodiment, PSCM toolset 108 may include one or more harvesting crate marking tools 445 to uniquely identify produce storage units such as harvesting bins, crates or boxes 150, that store produce 142 at the point of picking/harvesting. In an embodiment, marking tools 445 may even be configured to place markings on individual produce 142 (such as watermelons).

Any text, number, visual element, audio element, image, codes, or electronic signature used to identify a produce storage unit 150 (such as a harvesting crate 150) may be referred to as a harvesting crate identifier 152, 154. In an embodiment, a crate identifier 152, 154 may be a fixed printed label or other indicia, such as a text, number, bar code or matrix code, imprinted via a fixed media such as ink on a storage unit 150. In an alternative embodiment, a crate identifier 152, 154 may be a programmable electronic display (not shown in the figures) affixed to a storage unit 150, including for example and without limitation: an LED display or LDC display which can be configured or programmed to display various numbers or text, which may be used for some period of time and then changed at a suitable time (such as when a bin 150 is emptied and then new produce 142 is to be added). Crate marking tools 445 may be used to identify harvesting crates 150 via harvesting bin codes 152 or symbols 154, such as alphanumeric markings/codes 152 or bar codes or matrix symbol codes 154.

In an embodiment, the codes 152 or symbols 154 may not only identify each harvesting crate 150, but may also record or encode other, additional produce and harvesting data (some of which may be redundant with data stored on PSCM servers 190). Such additional data may include, for example and without limitation: the name of the farm or orchard 140; the time and/or date of harvesting; the name of the produce worker 100 who engaged in the harvesting; the type of produce 142 in the harvesting bin 150; and/or other data which may be helpful or convenient to have directly on the harvesting bin 150 itself.

Harvesting crate 150 may be marked via a variety of means and using a variety of alternative crate marking tools 445, either alone or in combination. Exemplary harvesting crate marking tools 445 may include, for example and without limitation: an ink stamping mechanism for directly printing ink onto harvesting bins 150 or produce 450; a label printer and labels (typically with adhesive to stick to harvesting bins 450); a laser marking tool for directly marking harvesting bins 150 or produce 450; an ink-spray printer for directly printing ink onto harvesting bins 450 and/or produce 142; a wired or wireless (WiFi, Bluetooth, or infrared) programming device or remote control device which configures and/or changes the indicia shown on a programmable electronic display (such as an LED or LCD display) affixed to a harvesting bin 450; and an RFID writer encoding RFID tags (not illustrated in the figure) which may be pre-attached to harvesting bins 150 or RFID tags which may be attached to harvesting bins 450 at point of picking. Other marking tools 445 may be envisioned as well with the scope and spirit of the present system and method.

Reader for Harvesting Crate Codes, Symbols, or Other Crate Identifiers:

In an embodiment of the present system method, harvesting crates, bins, or boxes 150 may come to the field already marked for identification. (For example, such markings may have 152, 154 may have been imprinted at the factory where the bins 150 were manufactured.)

Identification markings may include numbering or other alphanumeric labels 152; bar codes and/or matrix code symbols 154; or identifiers pre-coded on RFID tags (not illustrated) attached to the boxes 150. Other pre-field use labeling systems or elements may be envisioned as well. For any such labeling system, PSCM toolset 108 may include a suitable reading device to record the label data as harvesting bins 150 come into use for produce storage. Such labeling systems may include, for example and without limitation: bar code readers and/or symbol readers 450.1; text readers 450.2; RFID readers 450.3; and other readers as may be appropriate for the labeling system in use.

Applications: Exemplary Workflows

Workflows for harvesting produce 142 vary widely depending on the type of produce 142. Often produce 142 is field harvested into larger harvesting containers or harvesting bins 150 and packed into smaller crates or consumer-sized containers at one or more processing facilities. The current system and method, PSCM or the Farmer's Friend 102, is intended to provide traceability down to the level of harvesting bins or boxes 150, that is, whatever harvesting containers 150 are used to hold produce 142 when first picked or harvested in the orchard 140.

In an embodiment, PSCM 102 utilizes wireless wide area network (W-WAN) coverage 192 for field workers 100. In an alternative embodiment, the present system and method may batch upload the field information when filled harvesting containers 150 are brought back to the processing/packaging area, via either wireless (e.g., Bluetooth, 802.11) connections or wired connections. In an alternative embodiment, the PSCM system and method 102 may use cellular communications (the same or substantially similar to that used in consumer cell phones) to upload data to a central data server 190.

PSCM 102 also keeps the workers' 100 hands and eyes free so they can perform their tasks similarly to what they do today, while recording important data about the produce 142 via voice dictation and automated sensors 108.

Conventional Produce Harvesting Workflow: Apples

Figure 5:
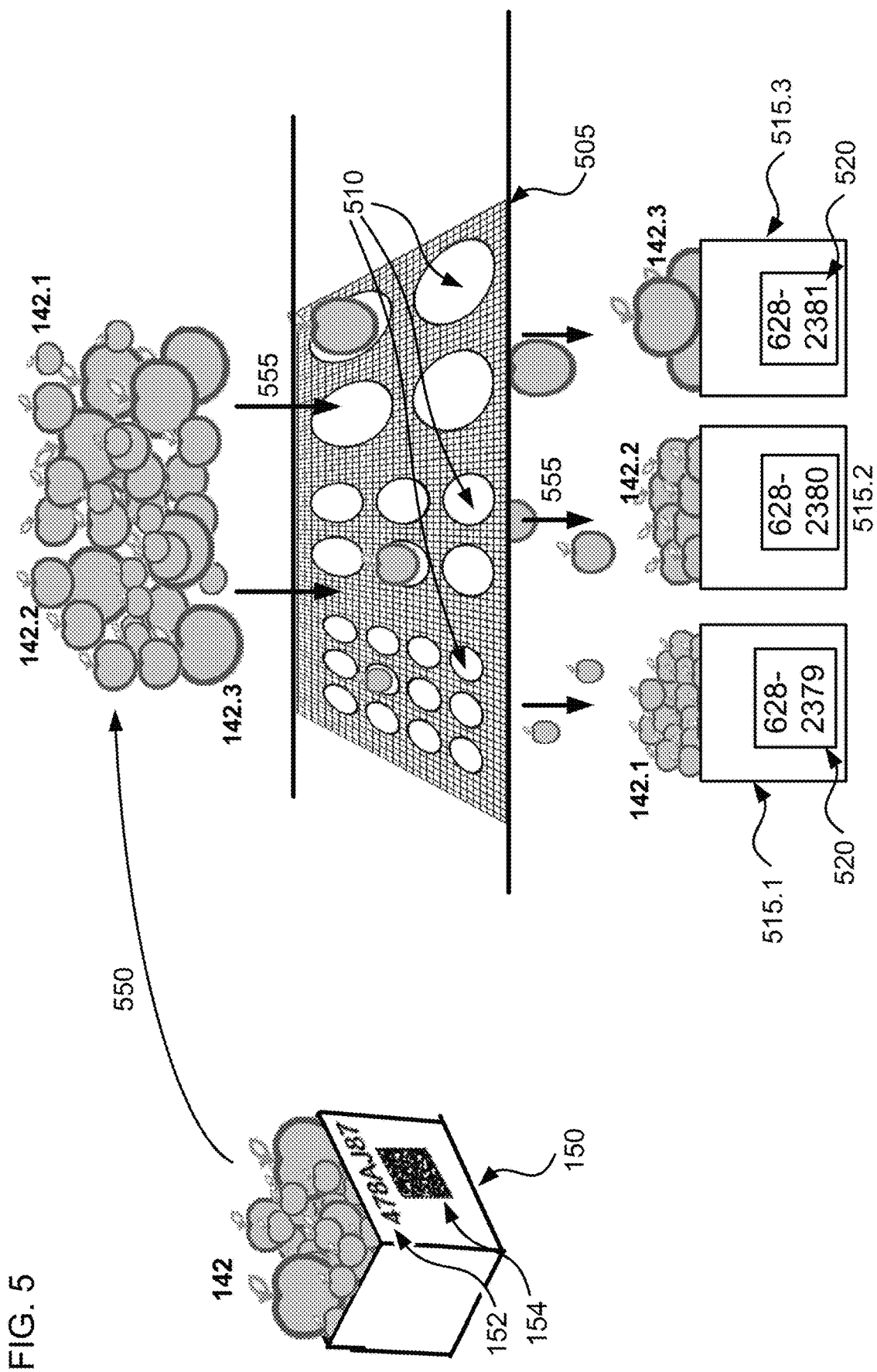
FIG. 5 illustrates an exemplary use of the PSCM system and method in conjunction with the transfer of produce from an initial harvesting container to subsequent packaging containers in an exemplary food chain, according to one exemplary embodiment of the present system and method.

This document presents here a summary of the conventional harvesting workflow process for picking apples 142 in an apple orchard 140, without the use of the present system and method. FIG. 5 illustrates some elements of the following discussions:

(1) Workers 100 pick apples 142 from trees 140 and place them into large 4'×4'×3' field harvesting bins 150 (illustrated but NOT shown to scale in FIGS. 1A, 1B, and 5).

(2) The harvesting bins 150 are picked up with a fork truck and dumped 550 onto a long conveyor system 505.

(3) The conveyor has a progression of smaller to larger holes 510. The apples 142 fall 555 through holes 510.

(3a) The smaller apples 142.1 fall 555 through the smaller holes and are packaged up for non-whole apple consumption (i.e. ciders, juices, peeled & sliced, etc. . . . ) in a small-apple packaging container 515.1.

(3b) Medium sized apples 142.2 fall 555 through the medium sized holes and are often bagged in medium-apple packaging containers 515.2 and sent to larger retail chains.

(3c) The largest apples 142.3 make it to the end of the conveyor 505, fall 555 though the large holes; are packed in large-apple packaging containers 515.3; and are transported and sold at the local produce markets or are packaged up as premium apples.

Present harvesting systems do not provide point-of-harvest traceability documentation.

Exemplary Produce Harvesting with PSCM: Apples

FIG. 6 is a flowchart of an exemplary electronic system processing method 600 (typically, a software method 600) of farm product harvesting with an exemplary PSCM system 102 as taught above in this application. In FIG. 6, for brevity, storage containers 150 are referred to as "BFP"s ("bins for farm products").

Stages of exemplary method 600 are described herein below in the context of an exemplary farm worker workflow process for picking apples 142 in an apple orchard 140, with the use of an exemplary PSCM system 102.

The discussion of the farmer's workflow, below, includes some elements as well of the processing by the PSCM system 102. Stages of the farm worker's workflow process are numbered below as stages (1) through (6), with appropriate substages (a), (b), (c), as appropriate. These numbers (1) through (6) (for worker activity stages) are separate and apart from the numbered method stages of processing method 600 (numbered 605 through 660); but appropriate correlations or connections are included in the discussion below.

In step 605 of method 600, a unique identifying number 152, 154 for a storage container 150 is recorded in the database 198 of a PSCM server 190. Related worker and processing activity is described here:

(1) A field worker 100 wearing a voice-driven system 102, and located at the tree(s) 140 from which he or she will pick apples 142:

(1a) Signs on and starts speaking. In an embodiment, the worker 100 may be prompted to identify himself or herself, or the worker 100 may know to do this as a matter of standard practice. Identification may be done via name or an ID code; or via a bar-coded or electronic worker Identification tag which establishes RF communications with the PSCM field device. (See corresponding method step 605 of method 600, where the PSCM system 102 receives and stores the worker name or ID number.)

(1b) Speaks the harvesting container number 152 or scans the identifying bar code or matrix code 154 on the harvesting container 150. (See corresponding method step 605 of method 600, where the PSCM system 102 receives and stores the identifying code.) In FIG. 1B, the exemplary container number 152 on the exemplary harvesting container 150 is "478AJ87".

(1c) Speaks what task he or she is performing (i.e. harvesting apples). See step 610 of method 600, where the PSCM system 102 receives a "start" indication from the field worker 100 that the bin is about to receive produce or other farm product 142.

(1d) The system, utilizing a real time clock 322, records the date and time.

(1e) The integrated location determination 340, 440 (for example, GPS 340.1) records the worker's location.

(1f) The PCSC system 102 associates the location of picking with the container number 152 or bar/matrix code 154.

Workflow steps (1d), (1e) and (1f) correspond to method steps 615 and 620, where the PSCM system 102 determines and records the time/date and location of harvesting.

(2) The worker 100 picks apples 142 off of trees 140 and places them into the harvesting containers 150. During this activity, other harvesting-related data may be recorded as well, as per method step 620. Various exemplary forms of such additional data (such as weather conditions, pictures of produce, and other such data) are enumerated elsewhere in this application.

(3) The worker 100 speaks a designated signal word or phrase, for example, "Finished" when he or she has completed filling a harvesting container 150. This corresponds to method step 630 of processing method 600. As per method step 635, the PSCM system 102 may also detect the time/date and location that harvesting into the bin 150 is completed. This data is stored and associated with the appropriate bin number.

(4) Steps (1) through (3) immediately above are repeated as necessary for picking more apples 142 and filling additional containers 150. The corresponding processing method steps 605 through 635 are repeated in parallel.

(5) The harvesting containers 150 are brought to a processing/packaging area where they're picked up with a fork truck and dumped 550 onto a long conveyor 505. (See FIG. 5, discussed above.)

(5) The conveyor has a progression of smaller to larger holes 510. (See again FIG. 5, discussed above.)

(5a) The smaller apples 142 fall 555 through the smaller holes and are packaged up in small-apple packaging containers 515.1 for non-whole apple consumption (i.e. ciders, juices, peeled & sliced, etc. . . . )

(5b) Medium sized apples 142 fall 555 through the medium sized holes, and are packaged or bagged in medium-apple packing containers 515.2; often, the apples are bagged and sent to larger retail chains.

(5c) The largest apples 142 make it to the end of the conveyor; fall 555 through the large holes; and are packaged or bagged in large-apple packing containers 515.3; often, they are sold at the local produce markets or are packaged up as premium apples.

Steps (5a), (5b) and (5c) above are supported by processing method step 640.

(6) Workers at the sorting and packing area (not illustrated in the figure):

(6a) Sign on and speak start.

(6b) Speak the container number 152 of the harvesting container 150. In an alternative embodiment, the container number 152 or bar code 154 of the harvesting container 150 is scanned by a suitable scanner (not illustrated) associated with the conveyor system 505.

(6c) Speak to print a label 520, a bar code, or a bar-coded label that is placed on the individual packing containers 515. In an alternative embodiment, a light or laser marking tool that would not require labels or ink is used to mark the packing containers 515. Shown in FIG. 5 are exemplary apple packing containers 515.1,2,3 labeled respectively with exemplary packing container labels 520: "628-2379", "628-2380", and "628-2381".

(6d) Pack apples 142 of similar sizes to the shipping crate level (not illustrated). That is, small apples in small-apple shipping containers 515.1 are shipped in shipping crates (not illustrated) designated for small apples; medium apples in medium-apple shipping containers 515.2 are shipped in shipping crates designated for medium apples, etc.

(6e) Speak to print a bar-coded label that is placed on the individual shipping crates. In an alternative embodiment, a light or laser marking tool that would not require labels or ink is used to mark the shipping crates.

In an embodiment, the bar code or other marking information on labels may contain some or all of the following: (i) Farm Information (name, location, etc.); (ii) Date and Time of picking and/or packing; (iii) Harvesting crate number 152; (iv) Location of picking (GPS information); (v) Field Picker 100 (that is, the name of the person who picked the apples) (vi) Crate Packer (the name of the person who packed the apples).

In an alternative embodiment, the bar code or other marking may contain primarily or exclusively a packing container number. Via data storage 194 on the PSCM server system 190, the packaging containers numbers 520 and shipping crate numbers are linked in a PSCM database 198 containing some or all of the pertinent information (date and time of picking, GPS location of picking, and other information).

The above steps (6) and (6a) through (6d), and associated data processing are supported by processing method step 645, which associates produce properties for transferred product with the appropriate receiving containers 515. The data connections are established by suitable software code in PSCM 102, which maintains suitable linkages between harvesting containers 150 and their labels/numbers 154, 152; packing containers 515 and their labels/numbers 520; and shipping containers and their numbers (not illustrated). Similar data linkages may be established and maintained as produce 142 is transferred to various other containers throughout the produce distribution chain.

Shown here are two exemplary linked tables (Table 1 and Table 2) which may be employed in an exemplary relational PSCM database 198:

TABLE 1

| Shipping Container # | Packaging Container # | Harvesting Container # | Worker ID |
| --- | --- | --- | --- |
| 101 | 628-2379 | 478AJ87 | 4746 |
| 101 | 721-1116 | 478AJ87 | 4746 |
| 101 | 904-1001 | 478CM29 | 4746 |
| 102 | 628-2380 | 478AJ87 | 4746 |
| 102 | 721-1117 | 478CM29 | 4746 |
| 102 | 904-1002 | 478CM29 | 4746 |
| 103 | 721-1118 | 478AJ87 | 4746 |
| 103 | 721-1118 | 478CM29 | 4746 |
| 103 | 904-1003 | 552EW60 | 4746 |

TABLE 2

| Harvesting Container # | Orchard | Harvesting Date/Time | Harvesting Location (deg) | ID # |
| --- | --- | --- | --- | --- |
| 478AJ87 | 47 | Jun. 30, 2016 1400 | 39.22131349 −77.2233976 | 4746 |
| 478CM29 | 47 | Jun. 30, 2016 1430 | 39.22131350 −77.2233976 | 4746 |
| 552EW60 | 47 | Jun. 30, 2016 1505 | 39.22131351 −77.2233975 | 4746 |

Linkage between the data in Table 1 and the data in Table 2 is established via the common key field "Harvesting Container #" present in both tables. Persons skilled in the art will recognize that, anywhere along the transport and distribution chain, an authorized party may: (i) access the database 198 (via suitable network connections); (ii) supply a shipping container number or packaging container number; and (iii) via suitable database operations, obtain appropriate data for the apples 142 in that container 150, including for example and without limitation: an identifying orchard number (which may in turn be linked to an orchard name via another table, not shown); a harvesting date and time; the name or ID of the farm worker 100 who harvested the produce 142; and a harvesting location for the apples 142 in the container 150.

In an embodiment of the present system and method—and again with reference to processing method step 625 of method 600—additional information and data may be stored as well. Some of this information may be ascertained in the field, by the farm-worker. Other data may be automatically collected from third-party sources (for example, weather information, rainfall data), or from databases local to the farm (for example, recent applications of fertilizers or the amount of water applied to the crops). This additional information and data may include, for example and without limitation:

(i) Pictures of the site where the apples 142 were picked, and/or pictures of the specific apple tree(s) 140.*n* where the apples were picked, either pictures initiated/collected by the worker 100 or automatically collected by cameras worn by the worker 100 (for example, time-dated photos taken at designated timed intervals);

(ii) pictures of selected apples 142 (either randomly selected; or those selected based on certain criteria such as possible signs of damage or disease);

(iii) chemical treatment(s) that were applied to the apples 142 either before harvesting or at the time of picking, or both;

(iv) information about insects detected near the apples 142 at the time of picking;

(v) weather conditions, which may be provided either by apple pickers 100 or via automated collection of information for weather web sites and other online sources;

(vi) environmental temperature at the time of picking or in the days preceding, or both;

(vii) environmental humidity at the time of picking or in the days preceding, or both;

(viii) air quality of the time of picking or in the days preceding, or both;

(ix) and other information deemed pertinent to, or required by statute for, maintaining a supply-chain record of the apples and their condition at the time of picking.

Once again, such additional data may be encoded, in part or whole, into labeling 152, 154 applied to the packing crate; or may be stored, in part or in whole, on a server database 198, with the data linked to the apples 142 via a crate number 152 or other suitable identifier.

Traceability

This system provides traceability documentation down to the harvesting container 150 for apple picking. For example, at any point along the food processing chain, including at the final point-of-sale, the origin of the farm produce and other data pertinent to the farm produce can be identified.

For example, in an embodiment, and with reference to method steps 655.1 and 660.1 of method 600: At any point along the food processing chain, a person may enter into the PSCM system 102 a request for data regarding produce 142 in a particular storage container 150. Such requests may be entered, for example, via a web interface (with suitable password access and other security controls) to the PSCM server 190 or other PSCM data servers 196. The PSCM system 102 can return all recorded data for produce 142 identified by a stored container number 150.

In an alternative embodiment, and with reference to method steps 655.2 and 660.2: At any point along the food processing chain, a person may enter into the PSCM system 102 a request for data regarding second produce 142 (not illustrated in the figures) which originated in proximity to the produce 142 in a particular storage container 150. Such proximity may be temporal, or spatial, or both.

Such requests may again be entered, for example, via a web interface to the PSCM server 190 or other PSCM data servers 196.

For example, produce in a sales storage unit numbered X1, may be identified, at the point-of-sale, as being diseased. A request may be entered to identify all other produce harvested at the same farm as the diseased produce, and within one week's time of the diseased produce. The following processing steps would occur (not illustrated in detail in the flow chart):

(1) The container number 150 of the first, diseased produce 142 (in this instance, X1) is received by the PSCM system 102.

(2) The PSCM system retrieves the location of harvesting (which may include not only GPS data but also a farm name), and also the date of harvesting. Alternatively, the farm can be identified based on retrieved GPS location data.

(3) The PSCM system determines a suitable date range for search (for example, starting one week before the disease produce was harvested, and up to one week after the diseased produce was harvested).

(4) The PSCM system searches its database for all second produce 142 harvested at the same farm, and within the specified date range.

(5) Because the produce has been tracked throughout the supply chain, the PSCM system 102 can determine and retrieve all the container numbers (X2, X3, . . . , Xn) for all second produce 142 harvested at the same farm within the specified time range. This includes not only the original harvesting containers 150, but also receiving containers 515 to which the produce has been transferred throughout the supply chain.

(6) Based on the container numbers 150, 515 (that is, X2, X3, . . . , Xn), the PSCM system can identify and supply the associated current locations in the supply chain of all second produce 142 (that is, produce which was harvested in proximity to first, diseased produce 142).

In this way, human investigators can identify the second produce 102 at its current locations, for example to test and determine if any of the second produce 102 shares the same disease as first produce 102.

Exemplary Produce Harvesting with PSCM: Grapes

The following discussion presents an exemplary workflow process employing an exemplary PSCM system 102 and its application for harvesting grapes with voice control technology:

(1) A field worker 100 wearing a voice-driven system 102, and located at the vines(s) 140 from which he or she will harvest grapes 142:

(1a) Signs on and starts speaking, recording his or her name;

(1b) Speaks the harvesting crate number 152;

(1c) Speaks what task he or she is performing (i.e. harvesting grapes);

(1d) The system, utilizing a real time clock 322, records the date and time;

(v) The integrated locationing system 340, 440 records the worker's location;

(vi) The PCSC system 102 associates the location of picking, date and time, the worker's name, and the task, with the harvesting crate number 152 or crate barcode 154.

(2) Workers 100 pick grapes 142 off the vine 140.n and place them into individual crates 150.

(3) When the worker 100 has completed filling a harvesting crate 150, he or she speaks to the PSCM system 102, directing it to print a bar-coded label 154. The label 154 is printed in the field, with a small portable printer 445 that the worker 100 has. The worker 100 places the label 154 on the individual harvesting crate 150. In an alternative embodiment, the PSCM system 102 would utilize a light or laser marking tool 445 for the crate 150, one that would not require labels or ink.

In an embodiment, the crate's bar code 154 or other marking may contain some or all of the following: (i) Farm Information; (ii) Date; (iii) Time; (iv) Harvesting crate number 152; (v) Location of picking (GPS information); (vi) Field Picker 100 (that is, the name of the person who picked the grapes) (vii) Crate Packer (the name of the person who packed the crate).

In an alternative embodiment, the bar code or other crate marking may contain primarily or exclusively a harvesting container number 152. Via data storage 194, 198 on the PSCM server system 190, the harvesting container number 152, 154 are linked in a database 198 to some or all of the pertinent information (date and time of picking, GPS location of picking, and other information).

In an embodiment of the present system and method, additional information and data may be collected as well by the field worker 100, and encoded into the crate labeling 152, 154, or stored on the PSCM server system 190. In an embodiment, the PSCM system 102, as worn by the worker 100 may have suitable sensors or data collection tools 108, such as cameras 430, thermometer 435.1, humidity sensor 435.2, chemical sensors (not illustrated in the figures), and other environmental sensors 435.

The data collected, and the information may include, for example and without limitation: pictures of the site where the grapes were picked; pictures of the specific grape vine(s) where the grapes were picked; pictures of selected grapes (either randomly selected; or those selected based on certain criteria such as possible signs of damage or disease); chemical treatment(s) that were applied to the grapes; information about insects observed near the grapes at the time of picking; weather conditions, which may be provided either by grape harvesting workers 100 or via automated collection of information from weather web sites and other online sources; environmental temperature at the time of picking or in the days preceding, or both; environmental humidity at the time of picking or in the days preceding, or both; air quality of the time of picking or in the days preceding, or both; soil quality information (either observed or recorded by a sensor integrated into the PSCM system 102); and other information deemed pertinent to, or required by stature for, maintaining a supply-chain record of the grapes and their condition at the time of picking.

Once again, such additional data may be encoded, in part or whole, into labeling 152, 154 applied to the harvesting crate 150; or may be stored, in part or whole, on server storage 194 in database 198, with the data linked to the grapes via a crate number 152, 154 or other suitable identifier.

This system provides traceability documentation down to the harvesting container 150 for grape harvesting.

Other Embodiments and Applications

Variety of Produce:

Person's skilled in the relevant arts will recognize that the above applications of the PSCM system 102, or Farmer's Friend 102, to apple picking and grape harvesting are exemplary only. The system and method of the Farmer's Friend 102 can be applied to the harvesting and collection of many kinds of farm produce 142, including for example and without limitation: apples, bananas, beans, berries, coconuts, corn, cucumbers, grapes, lettuce, onions, peaches, pears, peas, peppers, potatoes, tomatoes, squash, zucchini, and many other kinds of produce, sometimes with suitable adaptations for various kinds of produce. Depending on the accuracy of the location determination 340, the present system and method could possibly localize point-of-harvesting down to a specific row or two where the vegetable was harvested.

For an exemplary application, corn (maize) is picked from corn plants, rather than from trees. In operation, it may not make sense for a worker 100 to collect location information for each corn plant 142. However, a worker could collect double location information for each corn container 150; first, each time he/she starts filling a new corn basket 150, and then when he/she finishes filling the same corn basket 150.

For another example, in an embodiment, and for exceptionally large fruits (for example, watermelons), labeling could be applied not only to containers or crates, but possibly even to individual watermelons (enabling very fine-grained tracking of the produce). Conceivably, such per-produce labeling and tracking could be applied to smaller produce 142 as well, such as individual apples.

In an embodiment, other data could be noted, either visually by the farm worker 100 or via automated sensors. Such data could include, for example and without limitation, produce color, produce ripeness at time of harvesting, indicators of produce size, a general assessment of produce health, and other data deemed pertinent.

Tracking Produce Growth Over Time:

In an embodiment, application of the Farmer's Friend 102 need not be confined solely to the time of harvesting. The present system and method may also be used to monitor and record the growth and health of produce 142 throughout a season, from the time of planting or of first growth (for example, first emergence of budding apples) to the time of picking. For example, a photographic record could be made for all produce plants 140.n, or for selected produce plants, on an orchard or farm 140. Similarly, the Farmer's Friend may be used to record, at regular time intervals (for example, daily or weekly), applications of pesticides and other chemicals, weather conditions, soil conditions, the presence of insect populations, and other pertinent data. This may aid in determining the general health of an orchard or farm 140, and may also provide additional, valuable data in the event that some of the produce 142 which reaches market proves to be unhealthy.

Persons skilled in the relevant arts will recognize that database modifications may be implemented to maintain a timeline-oriented database of produce images and other pertinent produce data. Similarly, persons skilled in the relevant arts will recognize that suitable software can be designed for server 190 or other computer systems to create useful presentations of produce development and growth, based on the data collected over time.

Automated Picking:

Above, the Farmer's Friend or PSCM 102 has been described in exemplary embodiments as being utilized with hand-picked produce. However, in an alternative embodiment, PSCM 102 may also be employed with more automated or semi-automated produce harvesting systems.

For example, when an automated system is started up or initialized, location measurements can still be made. Even if the area which is harvested is large, the perimeters, corner points, or other harvesting area delineations may still be recorded. Similarly in place of a harvesting bin number, a truck number may be employed (if the produced is harvested into a large truck). The data may be automatically recorded as well. In an embodiment, even the type of produce may be automatically recorded, for example by equipping the fields with network nodes which store and transmit the types of crops planted in a given field or other designated region.

In such embodiments, the amount of produce harvested at a given time may be relatively large (again, for example, if the produce is collected into a truck or large harvesting bin, as opposed to smaller containers which may be employed for handpicking). Thus, the area from which the produce is collected may be relatively large, resulting in reduced resolution for produce location compared with hand-picked produce. Still, such automated data recording does provide potentially valuable information about produce origin, date of picking, and related data.

Data Analysis:

Data recorded by the PSCM 102 may be analyzed by the system to yield additional, useful derived data. Such data may include, for example and without limitation:

(1) Identification of trees, seed types, or fields that aren't producing or have low yield; and similarly identification of trees, seed types, or fields with exceptionally high produce yield.

(2) Yield comparison data for various farm parameters (for example, for different fertilizers, different amounts of water applied, etc. . . . ).

(3) Other operational acuity metrics that provide residual benefits to the producer.

Further Embodiments (A)

An Electronic System—

In further embodiments, labeled A1 through A10, the present system and method may also be characterized as:

A1. An electronic system configured to track a produce originating on a farm, comprising:

a timer configured to determine a time the produce is harvested;

a location detector configured to be used at a point of harvesting of the produce and to record at the time of the produce harvesting a location of the harvesting of the produce; and a hardware processor and memory to associate the time and the location of harvesting of the produce with a portable field storage unit which receives the produce upon harvesting.

A2. The electronic system of embodiment A1, further comprising a microphone configured to receive a vocal utterance from a person harvesting said produce, wherein:

said hardware processor is configured to interpret said vocal utterance, wherein an interpreted vocal utterance is generated, and to perform at least one of:

operating said electronic system according to the interpreted vocal utterance; and recording an item of information pertaining to the harvesting of the produce based the interpreted vocal utterance.

A3. The electronic system of embodiment A1, further comprising:

a marking system configured to place an identifier on the portable field storage unit which receives the produce upon harvesting, wherein:

the marking system is configured to assign to the portable field storage unit a unique identifier; and the hardware processor is configured to associate the time and the location of harvesting of the produce with the unique identifier of the portable field storage unit.

A4. The electronic system of embodiment A1, further comprising a reader configured to read codes or symbols on the portable field storage unit which receives the produce upon harvesting, said codes or symbols having been imprinted on the portable field storage unit at a time prior to the unit's use for harvesting, wherein:

the reader and the hardware processor are configured to uniquely identify the portable field storage unit via a unique identifier which is indicated by the codes or symbols; and the hardware processor is configured to associate the time and the location of harvesting of the produce with the unique identifier of the portable field storage unit.

A5. The electronic system of embodiment A1, wherein said hardware processor and said memory are further configured to maintain, upon transfer of said produce from the portable field storage unit to a receiving container of the food processing chain, an association between:

the harvested produce which was initially stored within the portable field storage unit and subsequently transferred to the receiving container; and the time of harvesting and the location of harvesting of the harvested produce.

A6. The electronic system of embodiment A1, wherein said hardware processor and said memory are further configured to maintain the association between the produce in the portable field storage unit and the time and location of harvesting of the produce during at least one of:

produce transport, produce processing, produce transfer from a first bin to a second bin, packaging of said produce, storage of said produce, and produce presentation at point of consumer or commercial sale.

A7. The electronic system of embodiment A1, further comprising a sensor configured to detect at least one of:

a condition of the produce at the time and place of harvesting of the produce; and a condition of the environment at the time and place of harvesting of the produce;

wherein said hardware processor and said memory are configured to associate the unique identifier of the portable field storage unit with the at least one of:

the condition of the produce at the time and place of harvesting of the produce; and the condition of the environment at the time and place of harvesting of the produce.

A8. The electronic system of embodiment A7, wherein said sensor comprises at least one of:

a camera to record a visual image of said harvested produce;

a thermometer to record a temperature of the environment at the time and location of harvesting of the produce; and a hygrometer to record a humidity of the environment at the time and location of harvesting of the produce.

A9. The electronic system of embodiment A1, further comprising:

a wireless communications system configured to transfer data between one or more portable field units of the electronic system and a data server of the electronic system, the data pertaining to the harvesting of said produce; and a server memory of the data server configured for storing the data received from the one or more portable field units of the electronic system;

wherein said data server is further configured to provide, to third-party data processing systems, said data pertaining to the harvesting of said produce.

A10. The electronic system of embodiment A9, wherein said wireless communications system is configured to employ batch data communications, wherein data from multiple portable field elements are transmitted to said remote server at common intervals in time.

Further Embodiments (B)

Stored Instructions on a Tangible Storage Medium (Software)—

In further embodiments, labeled B1 through B9, the present system and method may also be characterized as:

B1. A computer-readable, non-transitory storage medium comprising stored instructions that, when executed by a hardware processor of an electronic system, cause the hardware processor to execute a method to track a produce harvested on a farm, the method comprising:

determining via a timer of the electronic system a time the produced is harvested;

determining via a location detector of the electronic system a point of harvesting of the produce at the time of harvesting of the produce; and via the hardware processor and a memory of the electronic system, associating the time and the location of harvesting of the produce with a portable field storage unit which receives the produce upon harvesting.

B2. The computer-readable, non-transitory storage medium of embodiment B1, further comprising stored instructions that, when executed by the hardware processor of the electronic system, cause the produce tracking method executed by the hardware processor to further comprise:

receiving, via a microphone of the electronic system, a vocal utterance from a person harvesting said produce;

interpreting, via said hardware processor, said vocal utterance wherein an interpreted vocal utterance is generated; and performing via said hardware processor at least one of:

operating said electronic system according to the interpreted vocal utterance; and recording an item of information pertaining to the harvesting of the produce based on the interpreted vocal utterance.

B3. The computer-readable, non-transitory storage medium of embodiment B1, further comprising stored instructions that, when executed by the hardware processor of the electronic system, cause the produce tracking method executed by the hardware processor to further comprise:

via a marking system of the electronic system, placing an identifier on the portable field storage unit which receives the produce upon harvesting, wherein the portable field storage unit is assigned a unique identifier; and associating the time and the location of harvesting of the produce with the unique identifier of the portable field storage unit.

B4. The computer-readable, non-transitory storage medium of embodiment B1, further comprising stored instructions that, when executed by the hardware processor of the electronic system, cause the produce tracking method executed by the hardware processor to further comprise:

via a reader of the electronic system which is configured to read codes or symbols on the portable field storage unit, said codes or symbols having been imprinted on the portable field storage unit at a time prior to the unit's use for harvesting, reading an identifier on the portable field storage unit which receives the produce upon harvesting:

uniquely identifying the portable field storage unit via a unique identifier which is indicated by the read codes or symbols; and associating the time and the location of harvesting of the produce with the unique identifier of the portable field storage unit which receives the produce upon harvesting.

B5. The computer-readable, non-transitory storage medium of embodiment B1, further comprising stored instructions that, when executed by the hardware processor of the electronic system, cause the produce tracking method executed by the hardware processor to further comprise:

via the hardware processor and memory of the electronic system maintaining, upon transfer of said produce from the portable field storage unit to a receiving element of the food processing chain, an association between:

the harvested produce within the portable field storage unit; and the time of harvesting and the location of harvesting of the produce.

B6. The computer-readable, non-transitory storage medium of embodiment B1, further comprising stored instructions that, when executed by the hardware processor of the electronic system, cause the produce tracking method executed by the hardware processor to further comprise:

maintaining, via the memory of the electronic system, the association between the produce in the portable field storage unit and the time and location of harvesting of the produce during at least one of:

produce transport, produce processing, produce transfer from a first bin to a second bin, packaging of said produce, storage of said produce, and produce presentation at point of consumer or commercial sale.

B7. The computer-readable, non-transitory storage medium of embodiment B1, further comprising stored instructions that, when executed by the hardware processor of the electronic system, cause the produce tracking method executed by the hardware processor to further comprise:

detecting, via a sensor of said electronic system, at least one of:

a condition of the produce at the time and place of harvesting of the produce; and a condition of the environment at the time and place of harvesting of the produce;

associating, via the hardware processor and the memory, the unique identifier of the portable field storage unit with the at least one of:

the condition of the produce at the time and place of harvesting of the produce; and the condition of the environment at the time and place of harvesting of the produce.

B8. The computer-readable, non-transitory storage medium of embodiment B7, further comprising stored instructions that, when executed by the hardware processor of the electronic system; wherein the sensor of the electronic system comprises at least one of a camera, a thermometer, and hygrometer; cause the produce tracking method executed by the hardware processor to further comprise at least one of:

recording via the camera a visual image of said harvested produce;

recording via the thermometer a temperature of the environment at the time and location of harvesting of the produce; and recording via the hygrometer a humidity of the environment at the time and location of harvesting of the produce.

B9. The computer-readable, non-transitory storage medium of embodiment B1, further comprising stored instructions that, when executed by the hardware processor of the electronic system, cause the produce tracking method executed by the hardware processor to further comprise:

via a wireless communications system of the electronic system, transferring a data between one or more portable field units of the electronic system and a data server of the electronic system, the data pertaining to the harvesting of said produce;

storing, on a server memory of the data server, the received data pertaining to the harvesting of said produce; and providing, from said data server to a third-party remote data processing system, said data pertaining to the harvesting of said produce.

Further Embodiments (C)

Stored Instructions on a Tangible Storage Medium (Software)—

In a further embodiment, labeled C1, the present system and method may also be characterized as:

C1. A computer-readable, non-transitory storage medium comprising stored instructions that, when executed by a hardware processor of a server system, cause the hardware processor to execute a method to track a produce harvested on a farm, the method comprising:

receiving from an electronic farm monitoring system a data pertaining to a harvesting of a farm produce, said data comprising:

an identification of a first container which received a freshly harvested farm produce; and a time and location of harvesting of the freshly harvested farm produce in the first container;

associating the identification of the first container with the time and location of harvesting of the harvested produce in the first container;

receiving from a produce supply chain system an identification of a second container which receives the produce from the first container; and associating an identification of the second container with the time and location of harvesting of the produce which is received by the second container from the first container.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;

U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;

U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;

U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary data structures, and examples. Insofar as such block diagrams, flow charts, schematics, exemplary data structures, and examples contain one or more functions and/or operations, it will be understood by those skilled in the art that each function and/or operation within such block diagrams, flowcharts, schematics, exemplary data structures, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, DVDs, digital tape, flash drives, and other such computer memory devices and hardware as may be available.

The various embodiments described above can be combined to provide further embodiments. These and other changes can be made to the present systems and methods in light of the above-detailed description. In general, in the following claims, the terms used should not be construed to limit the invention to the specific embodiments disclosed in the specification and the claims, but should be construed to include all voice-recognition systems that read in accordance with the claims. Accordingly, the invention is not limited by the disclosure, but instead its scope is to be determined entirely by the following claims.

What is claimed is:

1. A method for a portable electronic system to track produce harvested on a farm, the method comprising:
    storing, via a processor of the portable electronic system, in a memory of the portable electronic system, a unique identifier associated with a harvesting bin;
    receiving, via a microphone of the portable electronic system, a voice command from a worker;
    filtering, by an audio filtering circuitry of the portable electronic system, the received voice command to distinguish an acceptable worker speech sample from a background speech sample, wherein the received voice command is filtered by comparing the received voice command to speech samples stored in the memory of the portable electronic system;
    converting, via the microphone of the portable electronic system, the filtered voice command into a digital signal comprising an indication that the harvesting bin is to receive the produce at a harvesting location;
    determining a harvesting time, for the harvesting bin to receive the produce that is harvested, based on the indication and a timer of the portable electronic system;
    determining coordinates of the harvesting location at the harvesting time based on the indication and a location detector of the portable electronic system;
    detecting, via at least one sensor of said portable electronic system, a condition of the produce at the harvesting time and the harvesting location; and
    associating, via the processor and the memory of the portable electronic system, the harvesting time, the harvesting location, and the condition of the produce with the identified harvesting bin which receives the produce upon harvesting and storing the association of the harvesting time, the harvesting location, and the condition with the identified harvesting bin in the memory.

2. The method of claim 1, wherein storing the unique identifier associated with the harvesting bin comprises:
    marking, via a marking tool of the portable electronic system, the unique identifier on the harvesting bin which receives the produce upon harvesting; and
    storing the unique identifier in the memory of the portable electronic system.

3. The method of claim 2, wherein marking the unique identifier on the harvesting bin via the marking tool comprises marking the harvesting bin via at least one of:
    imprinting a printed label on the harvesting bin via at least one of an ink stamping mechanism, a label printer, an ink spray printer, or a laser marking tool;
    programming an electronic display affixed to the harvesting bin via an electronic remote control device; or
    encoding an RFID tag attached to the harvesting bin via an RFID writer.

4. The method of claim 1, wherein a unique code or a symbol is previously imprinted on, embedded in, programmed into, or attached to the harvesting bin at a time prior to the harvesting bin's use for harvesting, and associating the unique identifier with the harvesting bin; and
    further comprising reading, via a reader of the portable electronic system, the unique code or the symbol.

5. The method of claim 1, wherein the indication that the harvesting bin is to receive the produce at the harvesting location further comprises:
    receiving, via a mechanical or a graphical interface of the portable electronic system, a manually entered command selection from the worker harvesting said produce.

6. The method of claim 1, further comprising:
    receiving, via a user interface of the portable electronic system, an indication of at least one of that the harvesting bin has been filled with the produce or that no more produce is available to fill the harvesting bin;
    determining a harvesting time when the produce harvesting into the harvesting bin is completed based on the indication and the timer of the portable electronic system;
    determining coordinates of the harvesting location of the completion of harvesting of the produce into the harvesting bin based on the indication and the location detector of the portable electronic system;
    detecting, via the at least one sensor of said portable electronic system, a condition of the produce at the harvesting time and the harvesting location of the completion of harvesting of the produce; and
    associating, via the processor and the memory of the portable electronic system, the harvesting time, the harvesting location, and the condition of the produce associated with the completion of harvesting of the produce into the harvesting bin with the identified harvesting bin which received the produce.

7. A method to track produce harvested on a farm, the method comprising:
    receiving, via a microphone of a portable electronic system, a voice command from a worker;
    filtering, by an audio filtering circuitry of the portable electronic system, the received voice command to distinguish an acceptable worker speech sample from a background speech sample, wherein the received voice command is filtered by comparing the received voice command to speech samples stored in a memory of the portable electronic system;
    converting, via the microphone of the portable electronic system, the filtered voice command into a digital signal comprising an indication that a harvesting bin is to receive the produce at a harvesting location;
    determining a harvesting time, for a harvesting bin to receive the produce that is harvested, based on a timer of a portable electronic system configured to be operated by the worker harvesting said produce;

determining coordinates of the harvesting location at the harvesting time based on a location detector of the portable electronic system;

detecting, via at least one sensor of said portable electronic system, a condition of the produce at the harvesting time and the harvesting location; and associating, via a hardware processor and the memory of the portable electronic system, the harvesting time, the harvesting location, and the condition of the produce at the harvesting time and the harvesting location with the harvesting bin which receives the produce upon harvesting and storing the association of the harvesting time, the harvesting location, and the condition with the harvesting bin in the memory.

8. The method of claim 7, further comprising:
performing via said hardware processor at least one of:
operating said portable electronic system according to the digital signal comprising the indication of the harvesting bin; or
recording an item of information pertaining to the harvesting of the produce based on the digital signal.

9. The method of claim 7, further comprising:
storing, via the hardware processor and the memory of the portable electronic system, upon transfer of said produce from the harvesting bin to a receiving element of a food processing chain, an association between:
the harvested produce within the harvesting bin; and
the harvesting time, the harvesting location, and the condition of the produce.

10. The method of claim 7, further comprising:
storing, via the memory of the portable electronic system, the association between the produce in the harvesting bin and the harvesting time, the harvesting location, and the condition of the produce during at least one of:
produce transport, produce processing, produce transfer from a first bin to a second bin, packaging of said produce, storage of said produce, and produce presentation at point of consumer or commercial sale.

11. The method of claim 7, further comprising:
detecting, via the at least one sensor of said portable electronic system, a condition of an environment at the harvesting time and the harvesting location; and
associating, via the hardware processor and the memory, the harvesting bin with the condition of the environment at the harvesting time, the harvesting location, and the condition of the produce.

12. The method of claim 11, wherein the at least one sensor of the portable electronic system comprises at least one of a camera, a thermometer, and a hygrometer, the method further comprising at least one of:
recording via the camera a visual image of said harvested produce;
recording, via the thermometer, a temperature of the environment at the harvesting time and the harvesting location; and
recording, via the hygrometer, humidity of the environment at the harvesting time and the harvesting location.

13. The method of claim 7, further comprising:
transferring, via a wireless communications system, data between one or more of the portable electronic system and a data server storing data pertaining to the harvesting of said produce;
storing, on a server memory of the data server, the received data pertaining to the harvesting of said produce; and providing, from said data server to a third-party remote data processing system, said data pertaining to the harvesting of said produce.

14. A method to track produce harvested on a farm, the method comprising:
receiving, from an electronic monitoring system, data pertaining to harvesting of produce, said data comprising:
an identification of a first container which receives the produce; and
a harvesting time and coordinates of a harvesting location of harvesting of the produce in the first container;
receiving, via a microphone of the electronic monitoring system, a voice command from a worker;
filtering, by an audio filtering circuitry of the electronic monitoring system, the received voice command to distinguish an acceptable worker speech sample from a background speech sample, wherein the received voice command is filtered by comparing the received voice command to speech samples stored in a memory of the electronic monitoring system;
detecting, via at least one sensor of said electronic monitoring system, a condition of the produce at the harvesting time and the harvesting location;
associating, in the memory of the electronic monitoring system, the identification of the first container with the harvesting time, the harvesting location, and the condition of the produce and storing the association of the identification of the first container with the harvesting time, the harvesting location, and the condition in the memory;
receiving from a produce supply chain system an identification of a second container which receives the produce from the first container; and
associating the identification of the second container with the harvesting time, the harvesting location, and the condition of the produce which is received by the second container from the first container.

15. The method of claim 14, wherein the second container receives and stores the first container along with the first container's stored produce, and wherein the method further comprises:
associating the identification of the second container with the identification of the first container which is stored therein.

16. The method of claim 14, wherein the produce supply chain system comprises a plurality of successive containers to which the harvested produce will be transferred from a prior container, and wherein the method further comprises:
upon transfer of the produce from the prior container to a successive container, storing in the memory of the electronic monitoring system an association between a unique identifier of the successive container with the harvesting time and the harvesting location of the produce transferred from the prior container to the successive container and contained therein.

17. The method of claim 14, further comprising:
detecting, via the sensor of said electronic monitoring system, a condition of an environment at the harvesting time and the harvesting location; and
associating, via a hardware processor and the memory, the identification of the first container with the condition of the environment at the harvesting time and the harvesting location.

18. The method of claim 14, further comprising:

storing, via the memory of the electronic system, the association between the produce in the first container and the harvesting time and the harvesting location during at least one of:

produce transport along a produce supply chain, produce processing along the produce supply chain, produce transfer from a labeled prior container to a labeled receiving container of the produce supply chain, packaging of said produce in a labeled packaging along the produce supply chain, storage of said produce in a labeled storage unit along the produce supply chain, and produce presentation at an identifiable point of consumer or commercial sale of the produce at a terminus of the produce supply chain.

19. The method of claim 18, further comprising:

at a data server of the electronic monitoring system, receiving a request for information pertaining to a first produce which is present in an identifiable container, packaging, a storage unit, a transport unit, or a point of sale of the produce supply chain;

retrieving from the memory of the electronic monitoring system the harvesting time and the harvesting location of the first produce identified in the request; and returning to a requestor, via the data server, the harvesting time and the harvesting location of the first produce identified in the request.

20. The method of claim 19, further comprising:

determining, via the electronic monitoring system, an identification of a second produce which is harvested at, at least one of:

a harvesting location which is the same as the harvesting location of the first produce or a harvesting location which is harvested within an identified range of the first produce; or a harvesting time which is the same as the harvesting time of the first produce or a harvesting time within an identified harvesting time range of the first produce; and determining, via the electronic monitoring system, at least one of a current storage unit and a current storage location of the second produce.

\* \* \* \* \*